(12) United States Patent
Nakai et al.

(10) Patent No.: US 7,712,183 B2
(45) Date of Patent: May 11, 2010

(54) ELECTRIC VACUUM CLEANER

(75) Inventors: Kouichi Nakai, Himeji (JP); Sadaki Kodera, Ono (JP); Akihiro Fukumoto, Kakogawa (JP); Chizuyo Matsumoto, Kasai (JP); Akihiro Morita, Kakogawa (JP); Hirotaka Shikano, Kasai (JP); Hideya Tsuchida, Kakogawa (JP); Yoshiaki Matsumoto, Kasai (JP); Eiji Mukumoto, Himeji (JP); Shigeki Inui, Himeji (JP)

(73) Assignee: Sanyo Electric Co., Ltd., Osaka (JP)

( * ) Notice: Subject to any disclaimer, the term of this patent is extended or adjusted under 35 U.S.C. 154(b) by 166 days.

(21) Appl. No.: 12/028,366

(22) Filed: Feb. 8, 2008

(65) Prior Publication Data

US 2008/0201897 A1 Aug. 28, 2008

(30) Foreign Application Priority Data

| Feb. 9, 2007 | (JP) | ............................. 2007-030049 |
| Jul. 2, 2007 | (JP) | ............................. 2007-173793 |
| Dec. 10, 2007 | (JP) | ............................. 2007-318040 |
| Dec. 11, 2007 | (JP) | ............................. 2007-319832 |

(51) Int. Cl.
*A47L 5/00* (2006.01)
*A47L 9/04* (2006.01)

(52) U.S. Cl. .......................... 15/365; 15/50.2; 15/52.2; 15/52; 15/99; 15/319; 15/383

(58) Field of Classification Search ................ 15/50.2, 15/52, 52.2, 98, 99, 364, 365, 381; *A47L 5/00, A47L 9/00, 9/04*

See application file for complete search history.

(56) References Cited

U.S. PATENT DOCUMENTS 6,859,976 B2 * 3/2005 Plankenhorn ................. 15/380
6,966,098 B2 * 11/2005 Sako et al. .................... 15/364

FOREIGN PATENT DOCUMENTS

| EP | 1 642 520 A1 | 4/2006 |
| JP | 52-139271 | 11/1977 |
| JP | 62-133904 | 6/1987 |
| JP | 5-192277 | 8/1993 |
| JP | 2004-222739 | 8/2004 |
| JP | 2005-304954 | 11/2005 |
| WO | WO 97/40734 | 11/1997 |

\* cited by examiner

*Primary Examiner*—David A Redding
(74) *Attorney, Agent, or Firm*—Rabin & Berdo, PC

(57) ABSTRACT

An electric vacuum cleaner (1) of the invention is adapted for wipe off cleaning using a sheet wound about a rotary brush (25) incorporated in a suction device (10). In order to wind a sheet (50) around a periphery of the rotary brush (25), a brush motor (44) rotates the rotary brush (25) in a predetermined direction at a predetermined rotational speed. At the same time, suction force of an electric blower fan (42) is set to the lowest level. This achieves the following advantage in a case where a wet sheet is used as the sheet (50). During sheet winding, water and alcohol released from the wet sheet (50) can be prevented from being scattered on a surface (100) to be cleaned. Further, the released water and alcohol do not adversely affect the electric blower fan (42).

11 Claims, 28 Drawing Sheets

POSITIVE ROTATION

POSITIVE/
NEGATIVE ROTATIONS

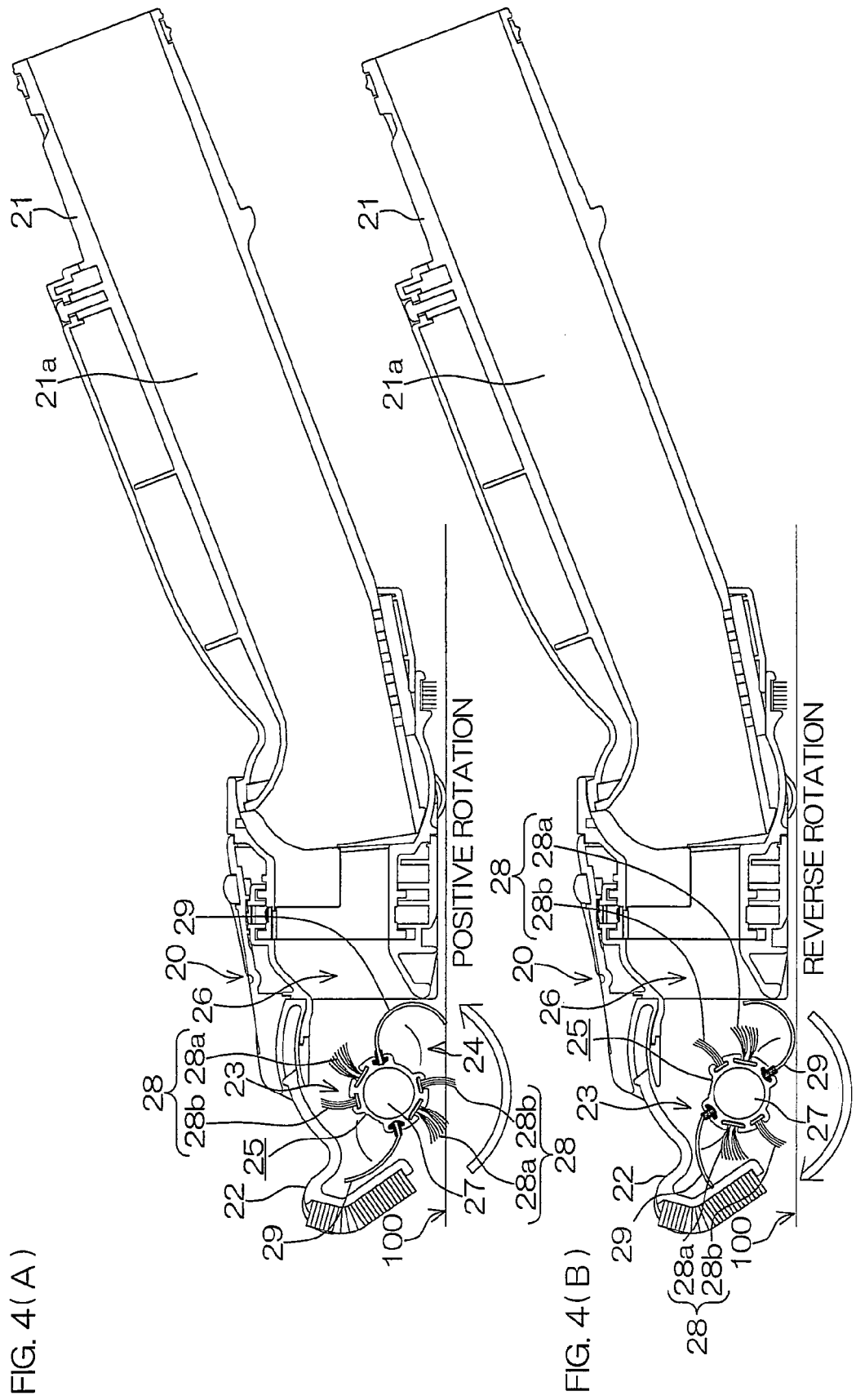

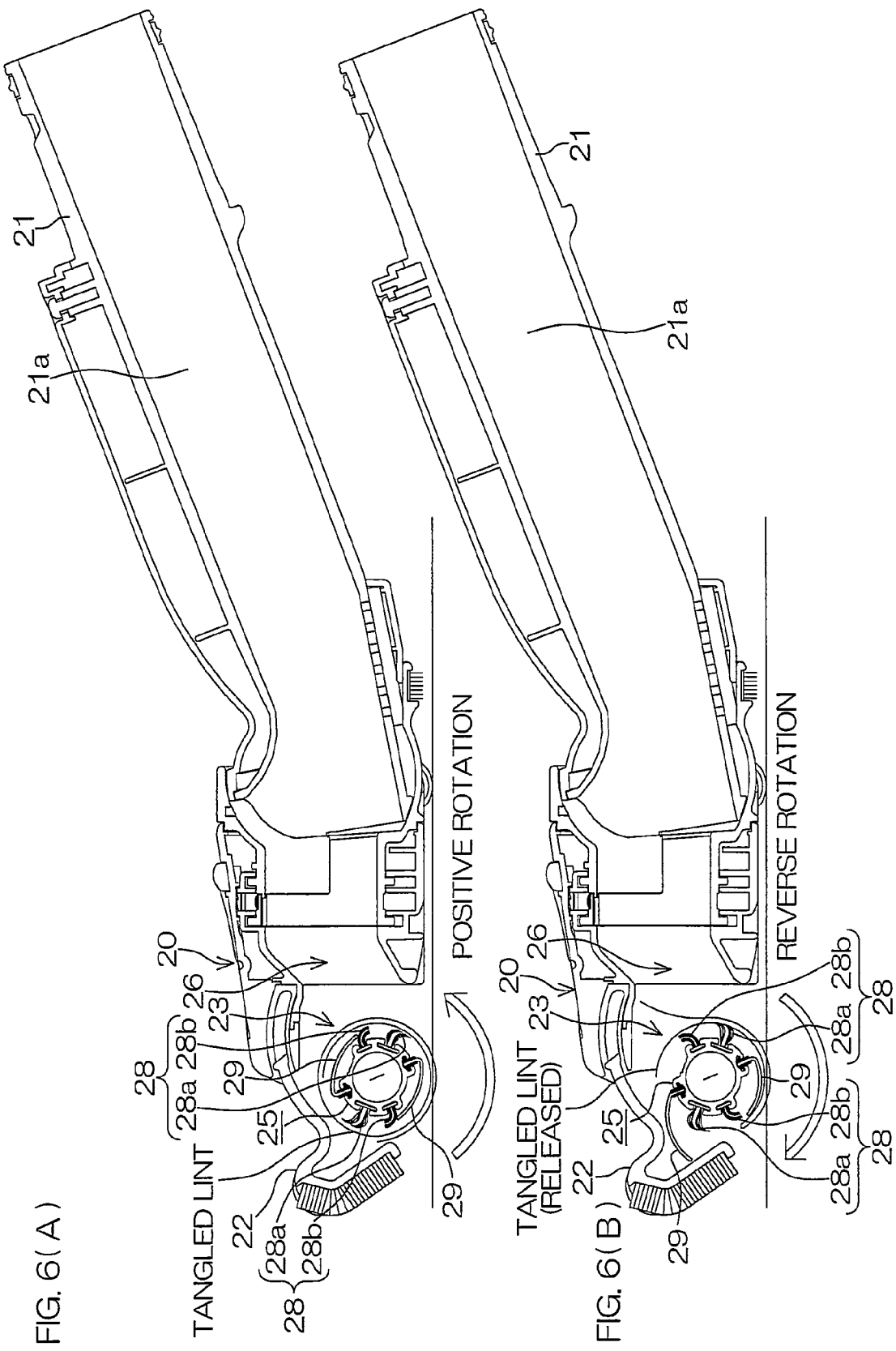

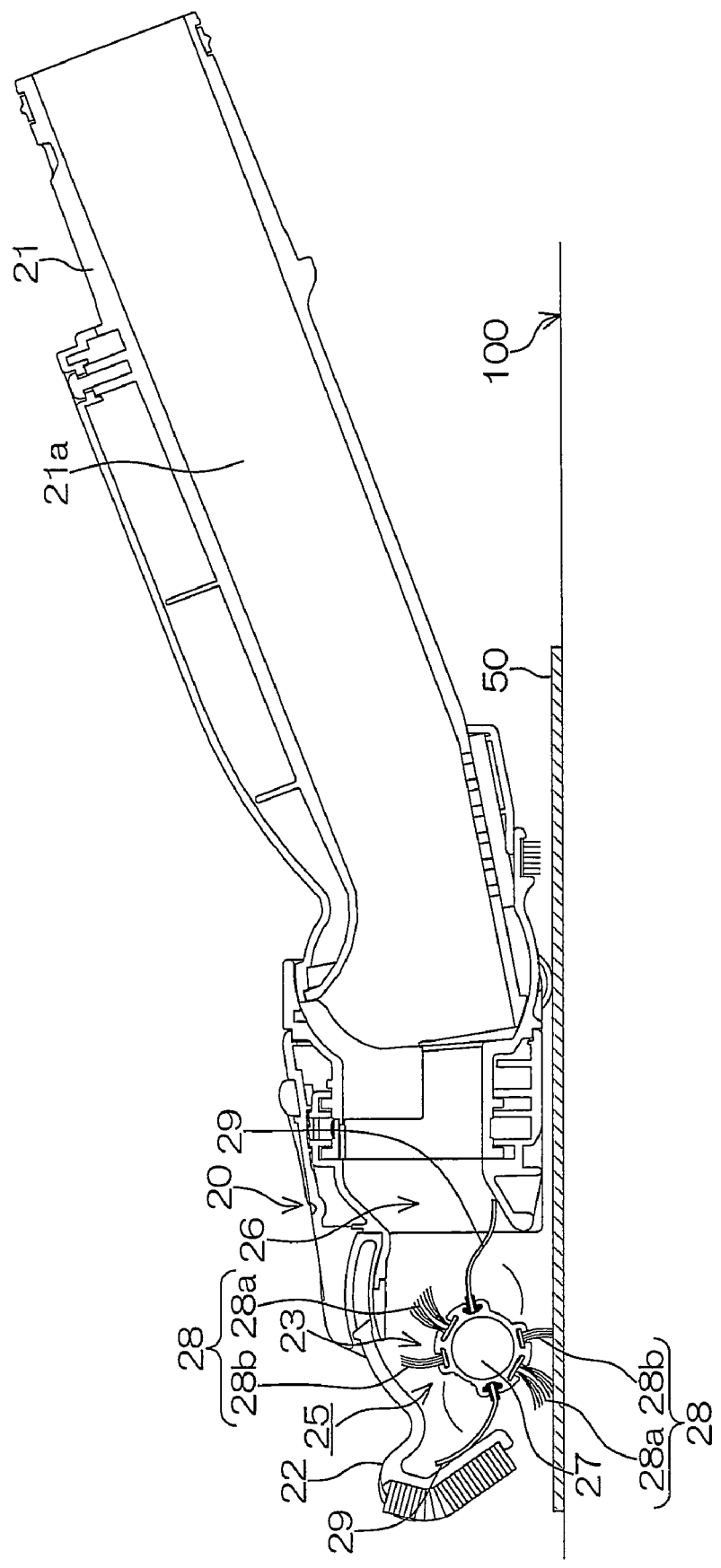

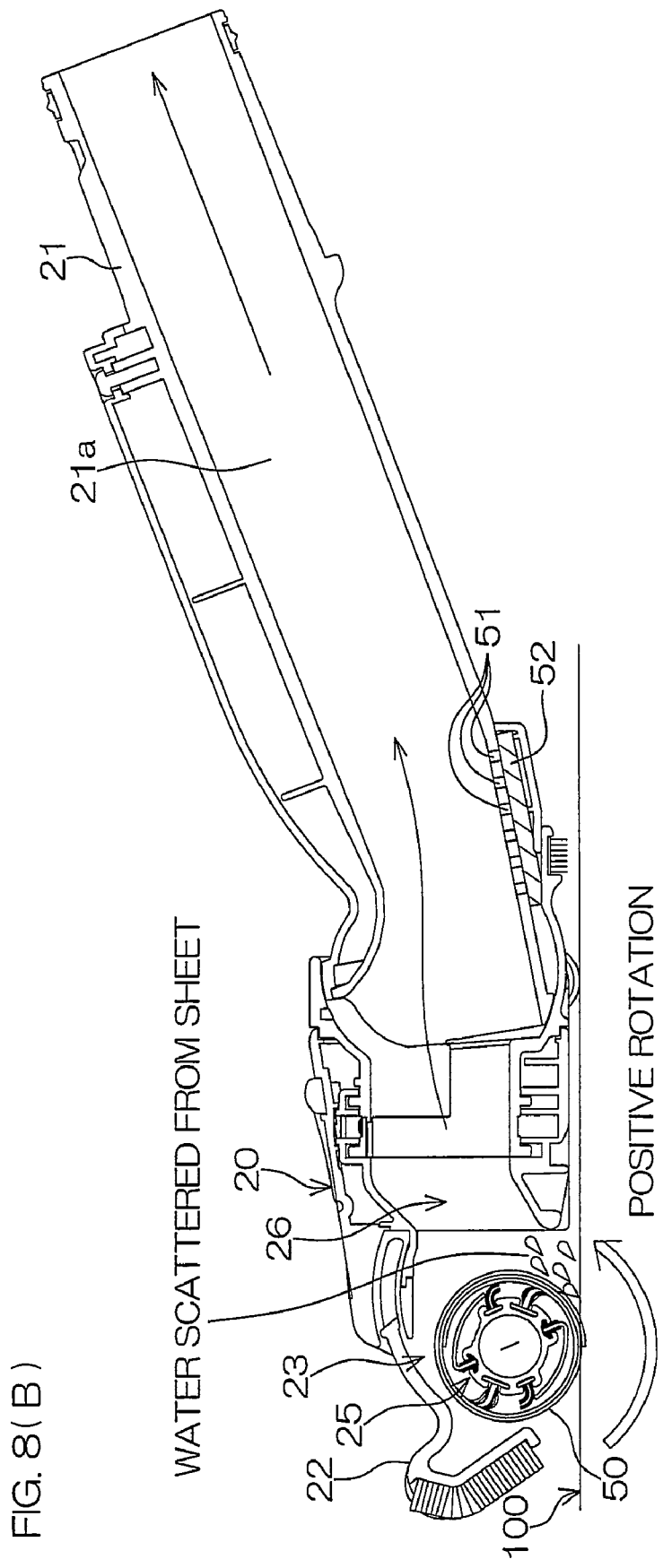

POSITIVE ROTATION

POSITIVE/REVERSE ROTATIONS

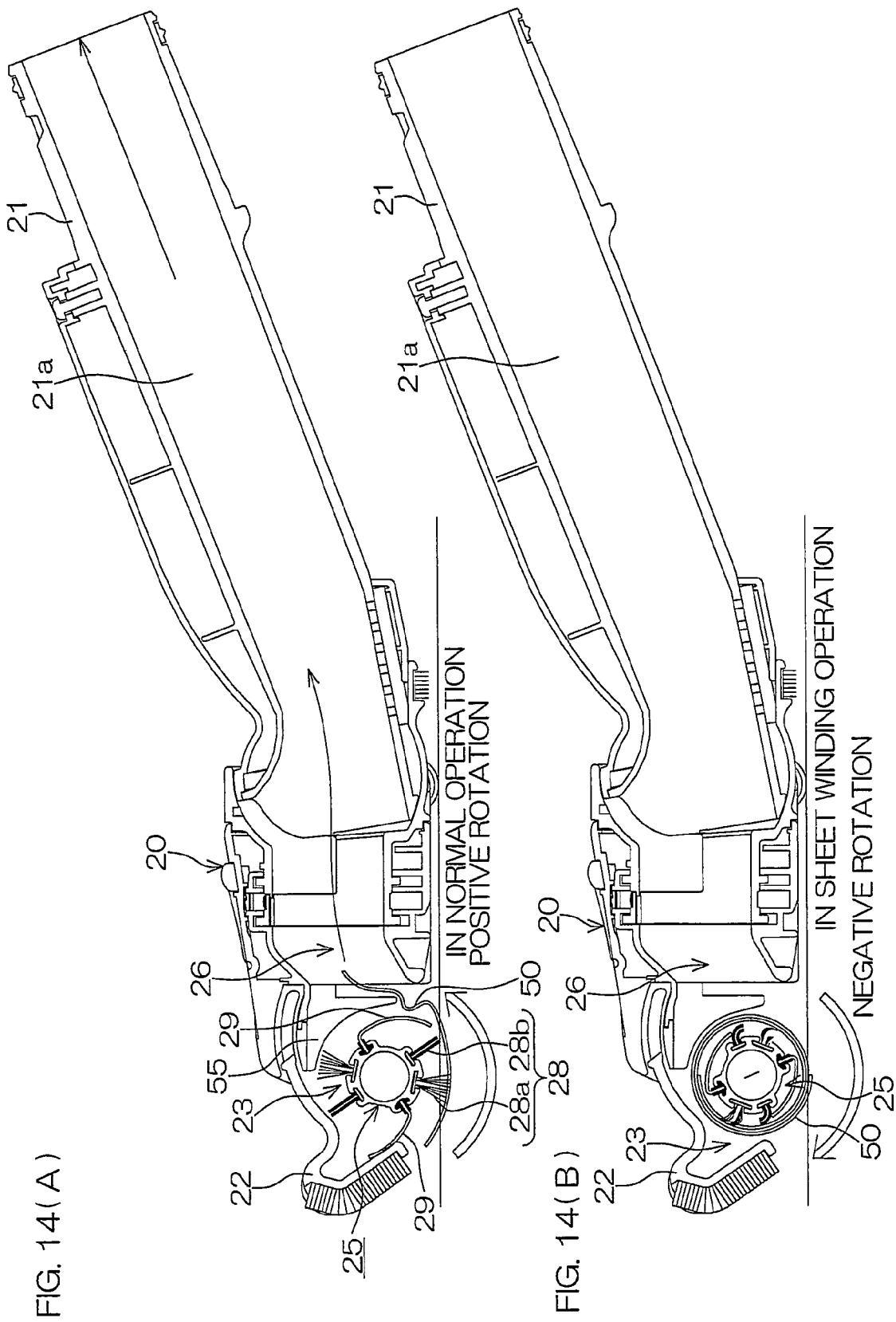

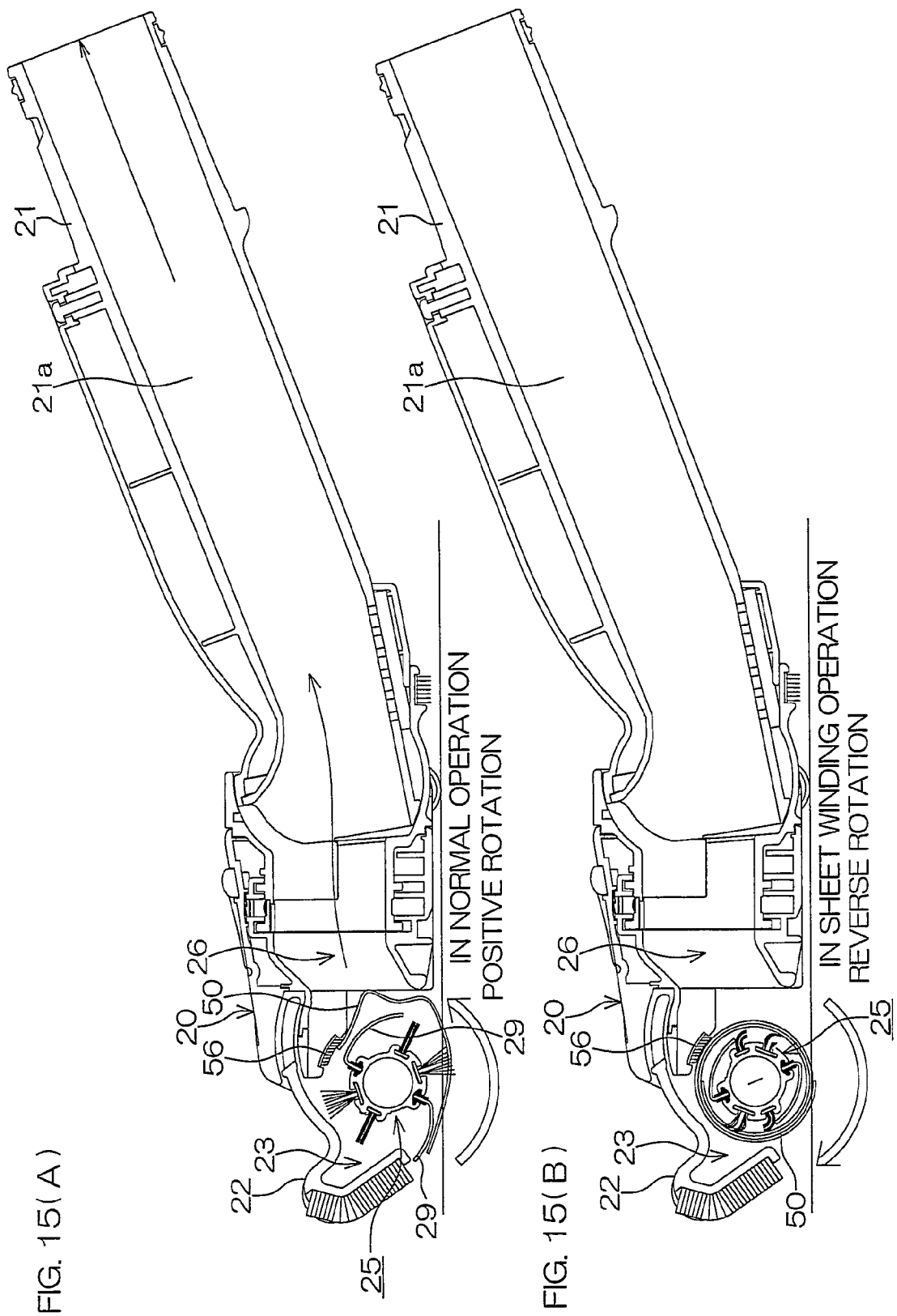

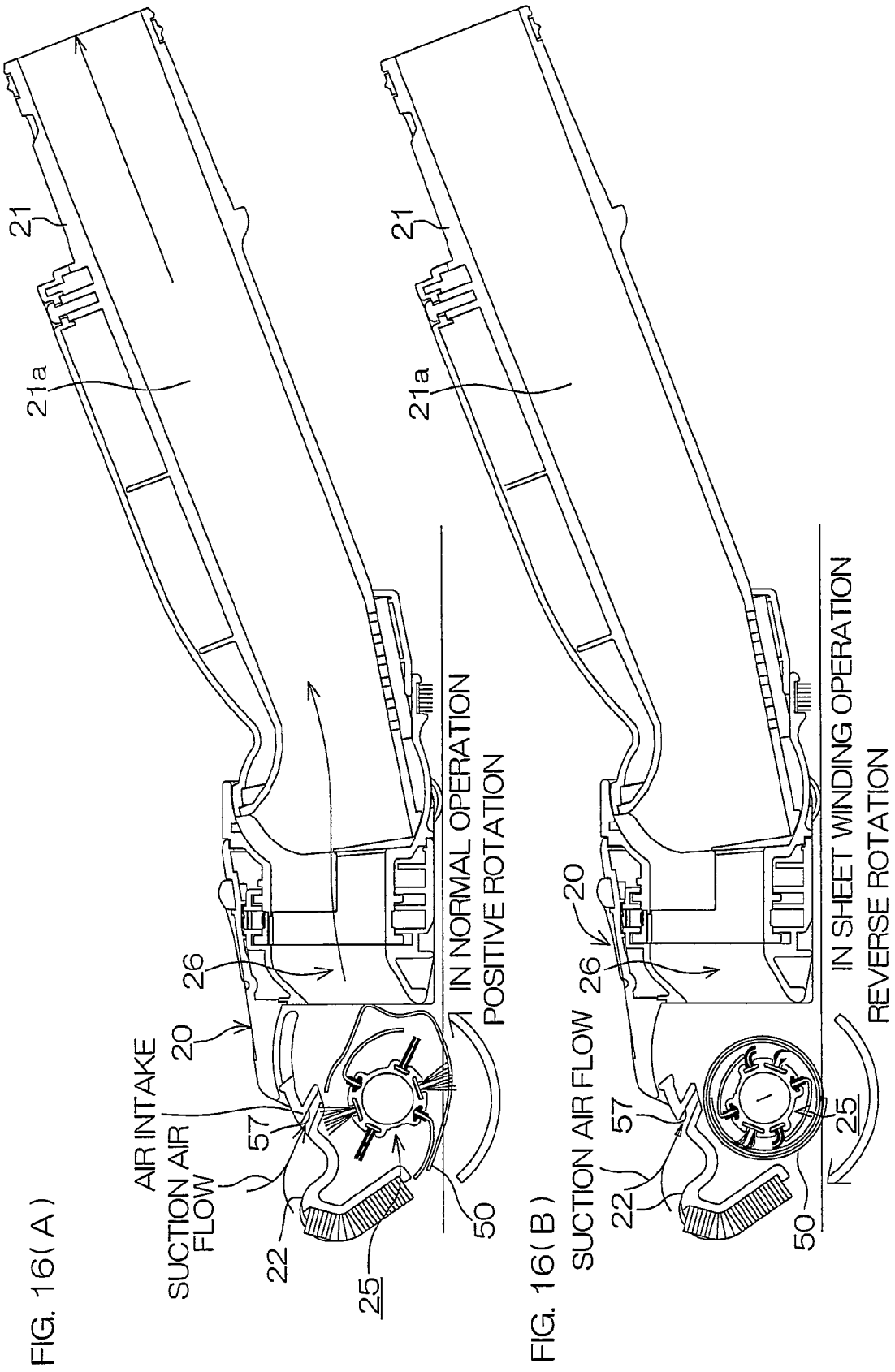

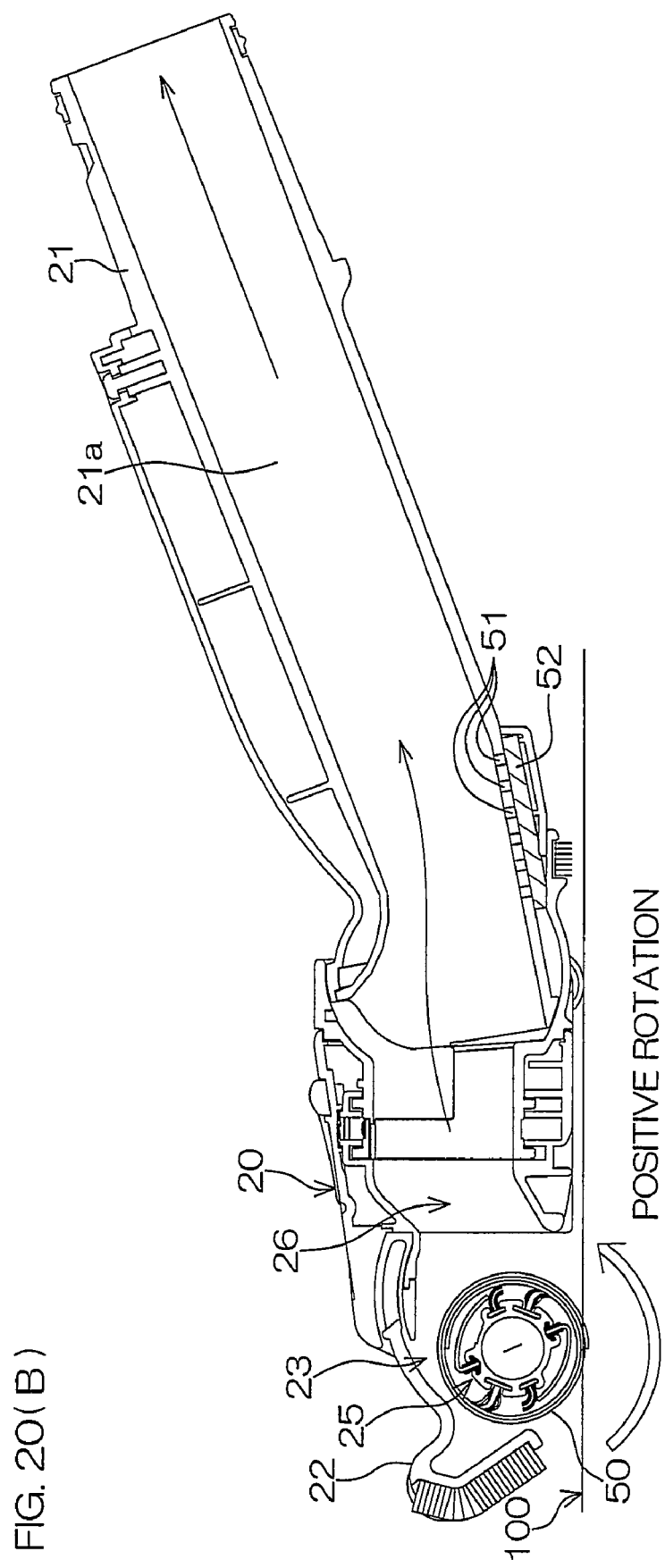

POSITIVE ROTATION

POSITIVE/REVERSE ROTATIONS

ELECTRIC VACUUM CLEANER

BACKGROUND OF THE INVENTION

1. Field of the Invention

The present invention relates to an electric vacuum cleaner. More particularly, the invention relates to an electric vacuum cleaner wherein a suction device incorporating therein a rotary brush driven by a motor is used as a suction device for sucking dirt and dust from a surface to be cleaned.

2. Description of Related Art

The electric cleaner generally includes an electric cleaner body for generating suction force, and the suction device attached to the cleaner body by unit of hose and pipe. The suction device known in the art includes a suction port opposed to the surface to be cleaned and incorporates the rotary brush in the suction port.

The rotary brush of the suction device is prone to become tangled with hair, lint and the like in conjunction with a cleaning operation. A proposal for easily removing the hair, lint and the like tangled about the rotary brush has been made by Japanese Unexamined Patent Publication No. 62-133904 (1987), for example.

The proposal by Japanese Unexamined Patent Publication No. 62-133904 (1987) is to previously cover a periphery of the rotary brush with a scavenging bag so that the filamentous dust tangled about the rotary brush can be easily removed by removing the scavenging bag from the rotary brush.

Japanese Unexamined Patent Publication No. 05-192277 (1993) has made another proposal that the rotary brush incorporated in the suction device is driven by a motor, and that whether the suction device is moved forwardly or backwardly is determined so as to change the rotational direction of the rotary brush.

Seeking to enhance the cleaning performance of the electric vacuum cleaner, the present applicants have already proposed an electric vacuum cleaner adapted for wipe off cleaning using a commercially available wet sheet (Japanese Unexamined Patent Publication No. 2005-304954).

In another approach to enhance the cleaning performance of the electric vacuum cleaner, the present applicants have already proposed an electric vacuum cleaner adapted for wipe off cleaning using a commercially available paper sheet such as paper towel (Japanese Unexamined Patent Publication No. 2004-222739).

In a case where the proposal by Japanese Unexamined Patent Publication No. 62-133904 (1987) is adopted for the removal of the hair, lint and the like tangled about the rotary brush, a user must periodically take the time to perform a manual operation of removing the scavenging bag. This is troublesome.

In a case where the rotary brush is driven by the motor, the rotational direction thereof can be switched from one direction to the other. However, Japanese Unexamined Patent Publication No. 05-192277 (1993) does not suggest that the hair, lint and the like tangled about the rotary brush can be removed by switching the rotation of the rotary brush between the two directions.

The arrangement disclosed in Japanese Unexamined Patent Publication No. 2005-304954 permits the wipe off cleaning using the wet sheet. However, the arrangement of this patent document has a problem that the suction device is increased in size because the device comprises a roller only for winding the wet sheet thereabout.

The arrangement disclosed in Japanese Unexamined Patent Publication No. 2004-222739 permits the wipe off cleaning using the paper sheet. However, this arrangement has a problem that a soiled sheet must be manually removed after the wipe off cleaning is finished, which causes discomfort to the user.

SUMMARY OF THE INVENTION

The invention has been accomplished in view of such problems of the prior art. A primary object of the invention is to provide an electric vacuum cleaner permitting wipe off cleaning using a sheet and capable of automatically removing the sheet.

Another object of the invention is to provide an electric vacuum cleaner capable of automatically winding a sheet around the periphery of the rotary brush and of automatically removing the sheet after the wipe off cleaning is finished.

Yet another object of the invention is to provide an electric vacuum cleaner capable of automatically untangling litter such as hair and lint tangled about the rotary brush.

The invention has the following constitution for solving the above problems.

In an electric vacuum cleaner according to the invention comprises: a suction device including a housing having a suction port opposed to a surface to be cleaned, a rotary brush disposed in the housing and having a periphery partially facing into the suction port, a motor incorporated in the housing and driving the rotary brush into rotation, and a cylindrical bend projecting from the housing and guiding air, dirt and dust sucked into the housing via the suction port; and an electric cleaner body connected to the bend of the suction device and generating suction force by unit of an electric blower fan, and being capable of winding a sheet around the periphery of the rotary brush and performing the wipe-off cleaning of the surface to be cleaned by using the sheet, the electric vacuum cleaner comprising sheet-removal control unit which operates the motor to drive the rotary brush in repeated positive and reverse rotations in order to remove the sheet wound around the periphery of the rotary brush.

This provides for automatic removal of the sheet wound about the rotary brush. Thus, the invention can offer an electric vacuum cleaner excellent in operability.

The sheet-removal controlling unit may increase the suction force of the electric blower fan to a high level.

As the suction force of the electric blower is set to the high level, the electric vacuum cleaner can utilize the strong suction force of the electric blower fan for automatically removing the sheet. Thus, the invention can offer an electric vacuum cleaner excellent in operability.

The sheet-removal controlling unit may activate the rotary brush after the lapse of a predetermined length of time from the startup of the electric blower fan.

Since the rotary brush is activated after the lapse of the predetermined length of time from the startup of the electric blower fan, the rotary brush is driven in rotation in a state where the electric blower fan generates a sufficient suction force. This ensures that the sheet is automatically removed more reliably.

The electric vacuum cleaner may comprise a sheet-winding control unit which operates the motor to rotate the rotary brush at a predetermined rotational speed and in a predetermined direction and controls the suction force of the electric blower fan to the lowest level when a sheet is wound around the periphery of the rotary brush.

Thus, the sheet can be properly wound about the rotary brush of the suction device, so that the rotary brush with the sheet wound thereabout can be used for performing the wipe-off cleaning of the surface to be cleaned.

A wet sheet may be used as the above sheet.

When the wet sheet is wound about the rotary brush, the suction force of the electric blower fan is set to the lowest level. Therefore, a minor amount of water, alcohol and the like released from the wet sheet being wound about the rotary brush may be prevented from being scattered on the surface to be cleaned and from being drawn into the electric blower fan.

The housing may have a blocking member provided therein for inhibiting the sheet from being wound around the periphery of the rotary brush when the rotary brush is rotated in the direction opposite to the predetermined direction.

This arrangement can hamper a user's attempt to wind the sheet about the rotary brush when the cleaner is in a mode other than the wipe-off cleaning mode wherein the sheet is wound about the rotary brush. Namely, the invention can offer an electric vacuum cleaner equipped with a so-called failsafe mechanism.

The electric vacuum cleaner may further comprise: a dust-collector function detecting unit arranged to determine whether a dust collector function provided in the electric vacuum cleaner is a predetermined dust collector function or not, and an inhibiting unit which inhibits the control by the wipe-off cleaning control unit in a case where the dust collector function detected by the dust-collector function detecting unit is the predetermined dust collector function.

The above arrangement can eliminate a problem which may be caused if the dust collector mechanism provided in the electric vacuum cleaner is so constructed as to be damaged by the sheet drawn therein.

The electric vacuum cleaner may have an arrangement wherein a wet sheet is used as the above sheet and wherein the motor rotates the rotary brush at a low rotational speed during startup and the rotational speed of the rotary brush is increased with time.

According to this arrangement, since the rotary brush is rotated at the low speed during startup, the electric vacuum cleaner is prevented from scattering water from the wet sheet and from sucking in the water thus scattered. The wet sheet gets dry at its surface in the course of cleaning, so that the wipe-off cleaning operation is lowered in efficiency. However, the rotational speed of the rotary brush is increased with time. Thus, centrifugal force is increased by increasing the rotational speed of the rotary brush, so that the water present in a rotary-brush side of the wet sheet is transferred to an outer side thereof for water supply. Thus can be prevented the decrease of efficiency of the wipe-off cleaning operation.

The electric vacuum cleaner may further comprise an invert control unit which supplies an inversion signal to the motor at a predetermined time, the inversion signal applied for a predetermined length of time to alternately switch the rotational direction of the rotary brush between positive rotation and reverse rotation.

This permits the rotary brush to be alternately switched between the positive rotation and the reverse rotation at the predetermined time. The alternating positive and reverse rotations of the rotary brush untangle the hair and lint wound around the periphery thereof, so that the hair and lint are easily removed from the rotary brush.

If the electric blower fan generates the suction force in this process, the hair and lint released from the rotary brush are drawn into the electric vacuum cleaner and captured therein. Hence, the electric vacuum cleaner can automatically perform the removal of hair, lint and the like tangled about the rotary brush at each predetermined time.

The predetermined time may be the start of the rotation of the rotary brush.

Alternatively, the predetermined time may be when a certain operation switch is operated.

If the rotational direction of the rotary brush is alternately switched between the positive rotation and the reverse rotation at the start of cleaning, namely at each start of the rotation of the rotary brush, the hair, lint and the like tangled about the rotary brush can be removed therefrom before the cleaning operation is started. Hence, the subsequent cleaning operation can be performed favorably.

An alternative arrangement may also be made such that a process for untangling the hair, lint and the like from the rotary brush is performed whenever the user depresses a predetermined operation switch.

The invert control unit may drive the electric blower fan into a preset high-power operation.

The rotary brush is alternately switched between the positive rotation and the reverse rotation while at the same time the electric blower fan is driven in high-power operation for generating the strong suction force, whereby the hair, lint and the like untangled from the rotary brush can be drawn into the dust collector and captured therein.

Specific embodiments of the invention will hereinbelow be described with reference to the accompanying drawings.

BRIEF DESCRIPTION OF THE DRAWINGS

FIGS. 4A and 4B are a group of right side views in vertical section of a suction device;

FIGS. 6A and 6B are a group of right side views in vertical section of a suction device 10;

FIG. 8A is a diagram showing a procedure of attaching a wet sheet 50 to the suction device 10 for performing wipe off cleaning;

FIG. 8B is a diagram showing the procedure of attaching the wet sheet 50 to the suction device 10 for performing the wipe off cleaning;

FIGS. 14A and 14B are a group of right side views in vertical section of the suction device 10 equipped with an example of a failsafe mechanism;

FIGS. 15A and 15B are a group of right side views in vertical section of the suction device 10 equipped with another example of the failsafe mechanism;

FIGS. 16A and 16B are a group of right side views in vertical section of the suction device 10 equipped with still another example of the failsafe mechanism;

FIG. 20B is a diagram showing the procedure of attaching the sheet 50 to the suction device 10 for performing the wipe off cleaning;

DETAILED DESCRIPTION OF PREFERRED EMBODIMENTS

Figure 1:
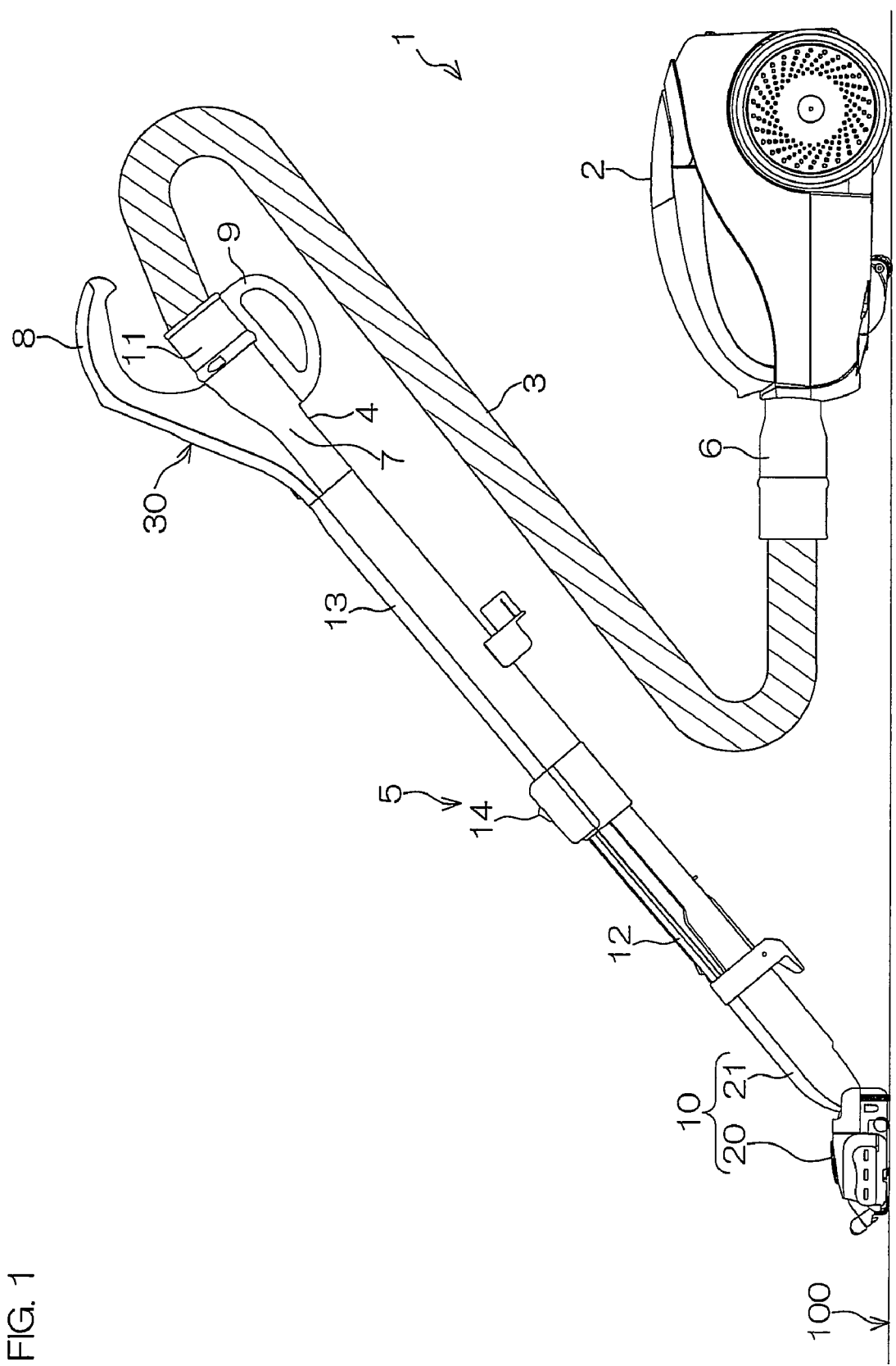
FIG. 1 is a right side view of an electric vacuum cleaner according to one embodiment of the invention.

FIG. 1 is a right side view of an electric vacuum cleaner 1 according to one embodiment of the invention.

For convenience, the following description is made on the assumption that the left-hand side in FIG. 1 means the front side, the right-hand side therein means the rear side, the near side therein means the left side, the far side therein means the right side, the upper side therein means top and the lower side therein means bottom. The description on the individual components of the electric vacuum cleaner 1 is also made while distinguishing front and rear, right and left, and top and bottom based on the above directional definition.

The electric vacuum cleaner 1 includes a cleaner body 2, a suction hose 3, an operation portion 4, a suction pipe 5 and a suction device 10.

The cleaner body 2 incorporates therein an electric blower fan (indicated at 42 in FIG. 3), which generates suction force. A connecting portion 6 disposed at one end (rear end) of the suction hose 3 is removably connected to a front side of the cleaner body 2. The suction hose 3 is flexible and bendable in any form. The operation portion 4 is attached to the other end (distal end) of the suction hose 3. The operation portion 4 comprises: a pipe portion 7 extending in an axial direction of the suction hose 3; a grip 8 extending rearwardly from the pipe portion 7 in a direction intersecting with the axial direction; and a sub-grip 9 disposed on the opposite side (spaced away at 180°) from the grip 8 with respect to the center axis of the pipe portion 7. A pivotal mechanism 11 is interposed between a distal end portion of the suction hose 3 and the operation portion 4 such that the operation portion 4 and the suction hose 3 are interconnected in a manner to be axially pivotable relative to each other. An operation panel 30 is provided on a front side of the grip 8. The operation panel 30 is provided with an array of operation keys to be described hereinlater.

The suction pipe 5 is an elongate pipe formed from, for example, a resin material and interconnecting the operation portion 4 and the suction device 10. The suction pipe 5 is divided into a front-end side portion 12 (to which the suction device 10 is attached) and a rear-end side portion 13 (to which the operation portion 4 is connected) at a general center of the length thereof. The suction pipe 5 is adapted for adjustment in length by way of the front-end side portion 12 so constructed as to be coaxially accommodated in the rear-end side portion 13. The length adjustment may be accomplished by operating a lock button 14 provided centrally of the suction pipe 5.

The suction device 10 includes a housing 20 and a bend 21 as a connecting tube. The bend 21 is assembled to the housing 20 in a manner to be pivotable at least in vertical directions.

The rear-end portion 13 of the suction pipe 5 is disengageable from the operation portion 4, and the operation portion 4 may also be connected directly to the bend 21 of the suction device 10.

Indicated by 100 in FIG. 1 is a floor surface as a surface to be cleaned.

Figure 2:
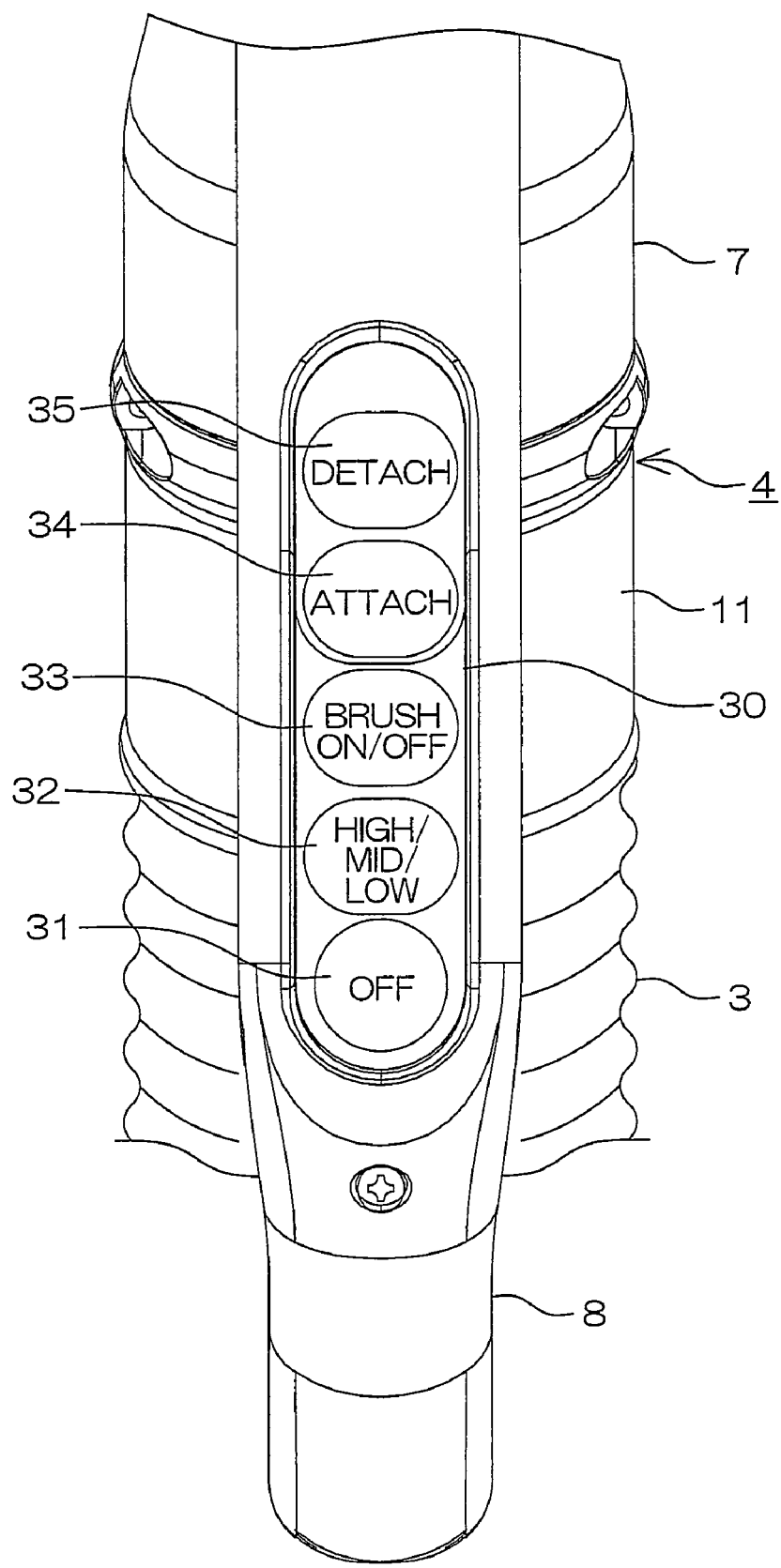
FIG. 2 is a plan view illustrative of an arrangement of an operation panel.

FIG. 2 is a plan view illustrative of an arrangement of the operation panel 30. As described above, the operation panel 30 is disposed on the front side of the grip 8. The operation panel 30 has the following five keys arranged thereon.

An "OFF" key 31 is operated (depressed) to end the operation of the electric vacuum cleaner 1 (all the operations thereof). That is, the OFF key is used for inputting a shutdown signal to shut down power supply to the electric vacuum cleaner 1.

A "High/Mid/Low" key 32 is used for inputting a startup signal and for inputting an operation mode (a level of the suction force of the electric blower fan 42) to the electric vacuum cleaner 1.

A "Brush ON/OFF" key 33 is used for inputting a signal to switch on or off a rotary brush 25 (FIG. 4) incorporated in the housing 20 of the suction device 10 during the operation of the electric vacuum cleaner 1 (during the operation of the electric blower fan 42).

An "Attach" key 34 and a "Detach" key 35 are depressed when a wet sheet is wound around a periphery of the rotary brush 25 incorporated in the housing 20 of the suction device 10 to execute a wipe-off cleaning mode and when the wet sheet wound about the rotary brush is removed.

Figure 3:
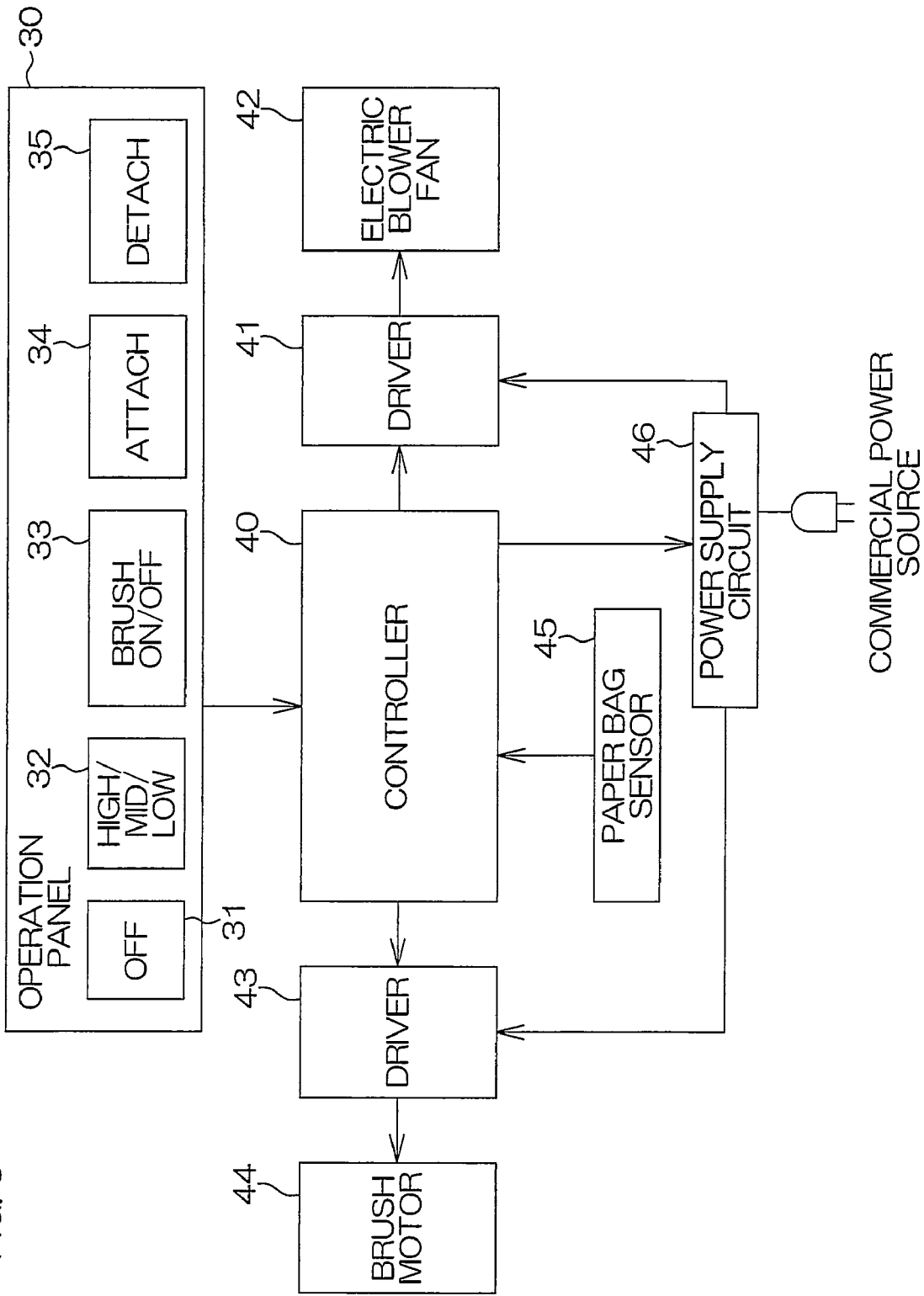
FIG. 3 is a block diagram showing an electrical configuration of the electric vacuum cleaner according to one embodiment hereof.

FIG. 3 is a block diagram showing an electrical configuration of the electric vacuum cleaner 1.

Each of the signals from the five keys arranged on the operation panel 30, namely the "OFF" key 31, "High/Mid/Low" key 32, "Brush ON/OFF" key 33, "Attach" key 34 and "Detach" key 35 are supplied to the controller 40. The controller 40 comprises electronic circuits such as CPU, ROM and RAM and functions as a control center of the electric vacuum cleaner 1. The controller 40 controls the driving of the electric blower fan 42 via a driver 41. The controller also controls the driving of a brush motor 44 via a driver 43. The brush motor 44 operates to rotate the rotary brush 25 disposed in the housing 20 of the suction device 10.

The controller 40 receives a signal from a paper bag sensor 45. The cleaner body 2 is adapted for selective loading of a paper bag or a plastic bin as a dust collecting bin, the plastic bin centrifugally separating dirt and dust and storing the separated dirt and dust. Whether the paper bag is loaded or the plastic bin is loaded is determined based on the signal from the sensor 45. In a case where the paper bag is loaded, the controller 40 performs control to inhibit the use of the wet sheet, as will be described hereinlater.

The electric vacuum cleaner 1 further includes a power supply circuit 46, through which electric power from a commercial power source is supplied to the drivers 41, 43.

FIG. 4A and FIG. 4B are right side views in vertical section of the suction device 10. The suction device 10 includes the housing 20 and the bend 21. The suction device is provided with an openable/closable shutter 22 forwardly of the housing 20. An accommodating chamber 23 is defined by the housing 20 and the shutter 22. The accommodating chamber 23 includes a suction port 24 which opposes the surface to be cleaned 100 in a state where the suction device 10 is placed on the surface to be cleaned 100 for carrying out cleaning. The rotary brush 25 is accommodated in the accommodating chamber 23 in a manner to face into the suction port 24.

As shown in FIG. 4A, the rotary brush 25 is capable of moving up dirt and dust on the surface to be cleaned 100 into the accommodating chamber 23 by rotating counterclockwise (positive rotation). The accommodating chamber 23 is formed with a communication opening 26 on the rear side thereof, so that the dirt and dust moved up by the rotary brush 25 and sucked air are drawn into the cleaner body 2 through the communication opening 26 and an air flow path 21a in the bend 21 (see FIG. 1).

The rotary brush 25 comprises: a rotary shaft 27 extending widthwise of the accommodating chamber 23 or transversely of the housing 20 (in a perpendicular direction to the paper surface); a brush 28 (28a, 28b) implanted on a periphery of the rotary shaft 27; and wing cloth 29 serving as a tangle-proof blade implanted on the periphery of the rotary shaft 27.

The brush 28 includes two types of brushes which include: a first brush 28a having a relatively greater width (a dimension in a circumferential direction of the rotary shaft 27) at its projected distal end; and a second brush 28b having a relatively smaller width at its projected distal end. Respective pairs of the first brushes and the second brushes are disposed at symmetrical positions spaced away at 180° from each other with respect to the rotational center of the rotary shaft 27.

Pieces of the wing cloth 29 in paired relation are also implanted at places spaced away at 180° from each other with respect to the rotational center of the rotary shaft 27. The wing cloth 29 is formed of a flexible material such as raised fabric raised on one side thereof. The wing cloth 29 has a greater projection dimension from the periphery of the rotary shaft 27 than that of the brush 28.

When the rotary brush 28 is positively rotated, the wing cloth 29 and the brush 28 are flexed rearwardly in the rotational direction as shown in FIG. 4A. The controller 40 can also control the brush motor 44 for rotating the rotary brush 25 clockwise (reverse rotation) as shown in FIG. 4B. During the reverse rotation of the rotary brush 25, the wing cloth 29 and the brush 28 are flexed in the direction opposite to the direction in which they are flexed during the positive rotation of the rotary brush 25, as shown in FIG. 4B.

Figure 5A:
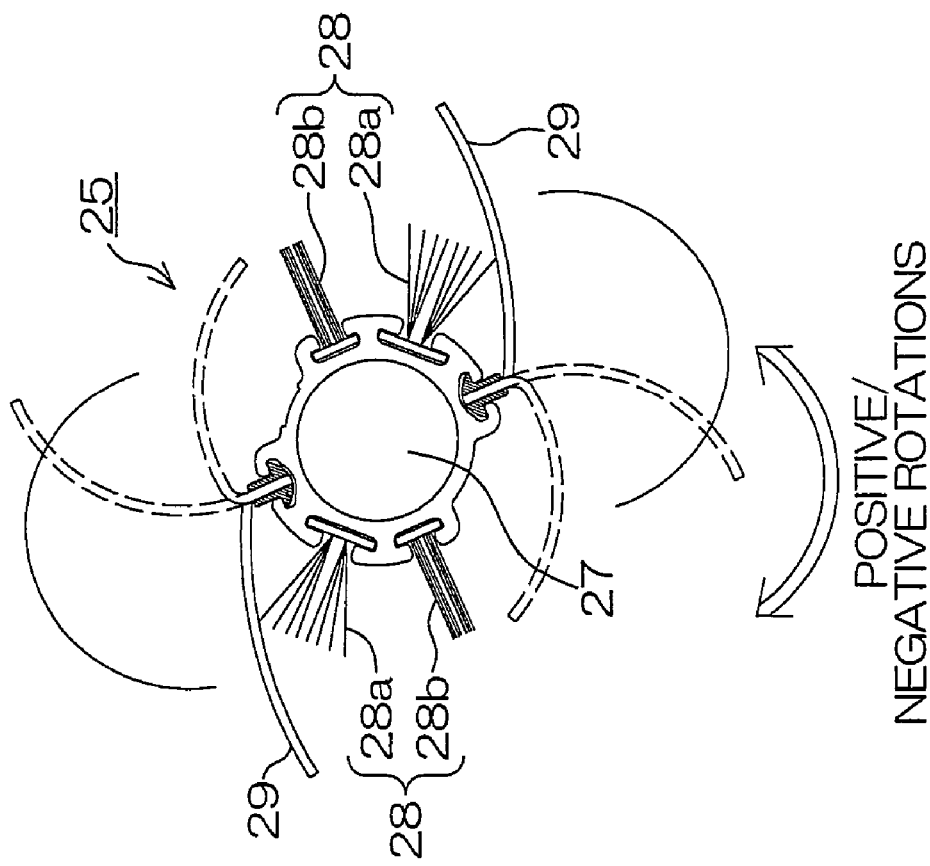
FIGS. 5A and 5B are a group of diagrams illustrative of a relation between the rotation of a rotary brush 25 and the degree of expansion of wing cloth 29.
Figure 5B:
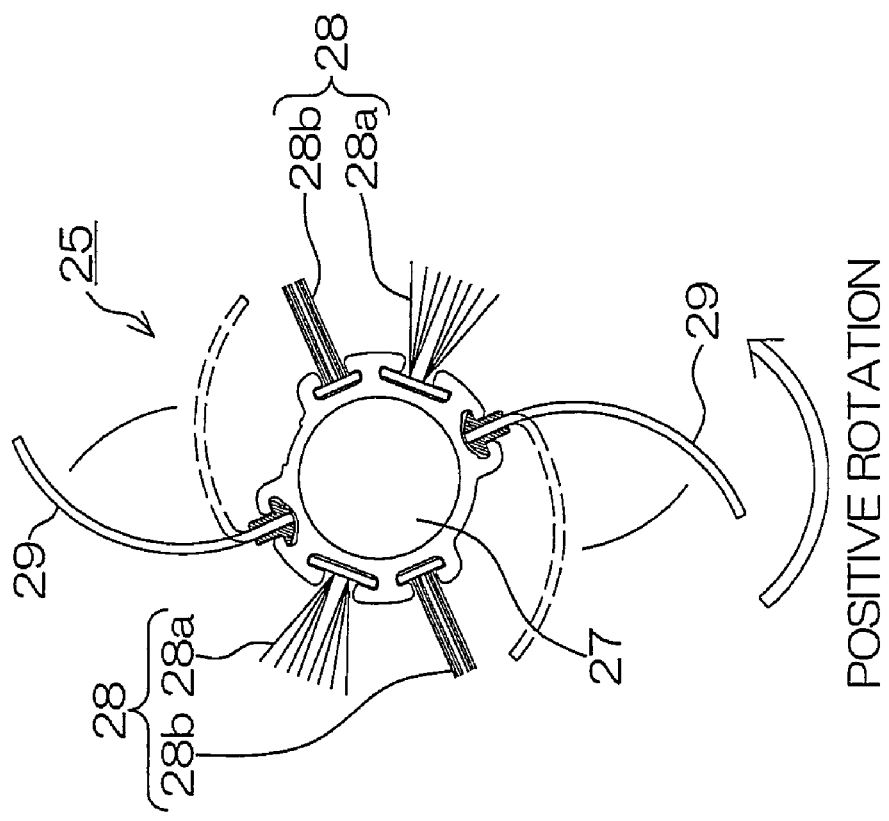

FIG. 5A shows the degree of expansion of the wing cloth 29 (centrifugally expanded) during the positive rotation of the rotary brush 25. FIG. 5B shows the degree of expansion of the wing cloth 29 when the rotary brush 25 is driven in alternating positive and reverse rotations (when the rotary brush is alternately switched between the positive rotation and the reverse rotation).

As apparent from comparison between FIG. 5A and FIG. 5B, the wing cloth 29 is radially expanded from the rotary shaft 27 to lift up from the rotary shaft 27 long dust such as hair and lint tangled around the periphery of the rotary shaft 27 when the rotary brush 25 is alternately switched between the positive rotation and the reverse rotation. The wing cloth 29 is thus capable of functioning to prevent the long dust from becoming tangled about the rotary shaft 27.

FIG. 6A and FIG. 6B are right side views in vertical section of the suction device 10. FIG. 6A illustrates how the hair, lint and the like are tangled about the rotary brush 25. FIG. 6B illustrates how the hair and lint tangled about the rotary brush 25 are untangled are released.

As shown in FIG. 6A, the hair, lint and the like become tangled about the rotary brush 25 while the rotary brush 25 is driven in the positive rotation and a normal cleaning operation is performed.

If the rotary brush 25 is driven in alternating positive and reverse rotations at a predetermined time, the lint and the like tangled about the rotary brush 25 may be untangled and released therefrom and the released lint and the like is drawn into the cleaner body 2 through the communication opening 26 and the air flow path 21a. The predetermined time may be, for example, at the start of cleaning operation when the rotary brush 25 is started to rotate, or at the time of operation of a certain switch.

In the electric vacuum cleaner 1 of the embodiment, a control operation for driving the rotary brush 25 into the positive and reverse rotations is automatically performed at a predetermined time and for a given time period in order to prevent the hair, lint and the like from becoming tangled about the rotary brush 25. Such a control is executed by the controller 40 described with reference to FIG. 3.

Figure 7:
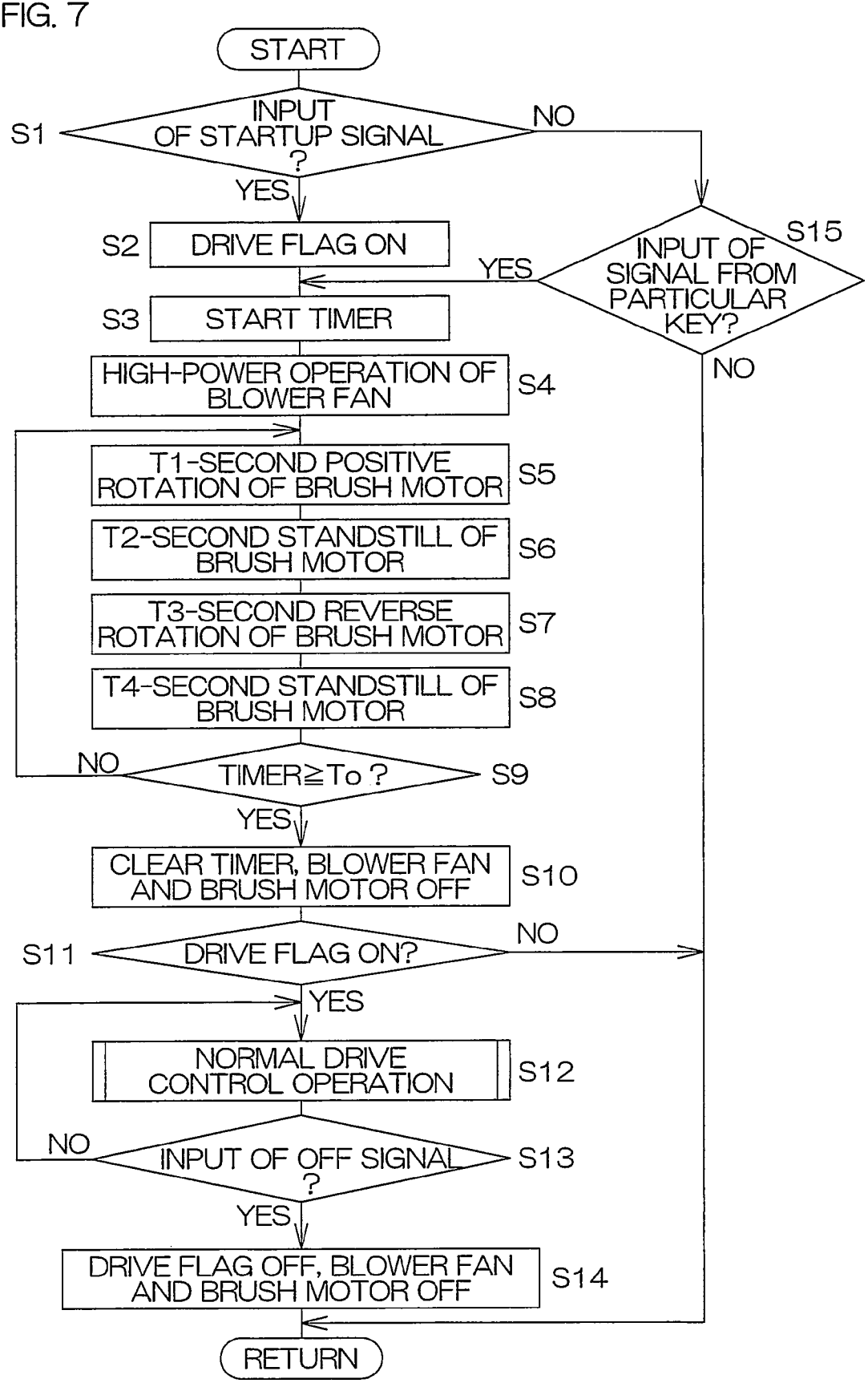
FIG. 7 is a flow chart showing an example of the steps of a control operation executed by a controller 40.

FIG. 7 is a flow chart showing an example of the steps of the control operation executed by the controller 40 shown in FIG. 3. The chart shows the contents of the control operation for untangling and removing the hair, lint and the like tangled about the rotary brush 25, as described with reference to FIG. 6.

Referring to FIG. 3 and FIG. 6, description is made according to the flow of FIG. 7.

The controller 40 determines whether the startup signal is inputted or not (Step S1). In this embodiment, the startup signal is supplied to the controller by depressing the "High/Mid/Low" key 32, while signals directing high-power operation to mid-power operation to low-power operation to high-power operation of the electric blower fan 42 are cyclically changed in this order according to the number of depressions of the "High/Mid/Low" key 32 and supplied to the controller.

Detecting the input of the startup signal, the controller 40 turns on a drive flag disposed in, for example, a RAM (Step S2), starting a timer (Step S3) and driving the electric blower fan 42 in high-power operation (Step S4). That is, in this embodiment, the depression of the "High/Mid/Low" key 32 first triggers the high-power operation of the electric blower fan 42 regardless of the number of depressions of the key.

Subsequently, the brush motor 44 is driven in T1-second positive rotation (Step S5), followed by T2-second standstill (Step S6), T3-second reverse rotation (Step S7) and T4-second standstill (Step S8). This driving procedure is carried on till the timer counts a predetermined time T0 (Step S9).

An exemplary drive time may include T1=0.2 second, T2=0.2 second, T3=0.5 second, and T4=0.2 second. At the startup of the electric vacuum cleaner 1, this control operation alternately switches the rotary brush 25 between the positive rotation and the reverse rotation for T0 second. Thus, the hair and lint tangled about the rotary brush 25 may be untangled, as described with reference to FIG. 6. Further, the electric blower fan 42 is driven in high-power operation in conjunction with the positive and reverse rotations of the rotary brush 25. Thus, the strong suction force acts to ensure that the hair and lint untangled from the rotary brush 25 are assuredly drawn into the cleaner body 2. That is, the strong suction force is generated in conjunction with the operation of repeating the positive and reverse rotations of the rotary brush 25 for untangling the hair and lint therefrom. Therefore, the hair and lint can be released from the rotary brush 25.

In this embodiment, the timer is started in Step S3 and determination is made in Step S9 as to whether the timer has counted T0 second or not. Alternatively, the timer may be replaced by a counter to count the number of times at which the operations of Steps S5 to S8 are performed. When the operations of Steps S5 to S8 are repeated a predetermined number of times (e.g., five times), the operation flow may proceed to Step S10.

The embodiment interposes the stop times T2, T4 in changeover times between the positive and reverse rotations of the rotary brush 25 in order to increase the durability of the brush motor 44 driving the rotary brush 25. However, the stop time may be omitted if the brush motor 44 is of a type which can ensure a desired service life even when the rotational direction thereof is consecutively changed without the stop time. The lengths of times T1, T2, T3, T4 are arbitrary.

In Step S10, the timer is cleared and stopped, while the electric blower fan 42 and the brush motor 44 are turned off. That is, the driving operation of the electric vacuum cleaner 1 is temporarily stopped. Subsequently, the controller 40 determines whether the drive flag is on or not. Since the drive flag is turned on in Step S2, this control operation proceeds to Step S12 to perform a normal drive control operation. That is, based on the number of depressions of the "High/Mid/Low" key 32 supplied together with the startup signal, the electric blower fan 42 is so driven as to generate a suction force corresponding to the input signal.

In the normal drive control operation, the rotary brush 25 is switched to the positive rotation or to standstill each time the "Brush ON/OFF" key 33 on the operation panel 30 is depressed. Such a normal drive control operation implements the cleaning by unit of the electric vacuum cleaner 1.

When the cleaning is finished, the user depresses the "OFF" key 31 on the operation panel 30. Detecting the input of an OFF signal (YES in Step S13), the controller 40 turns the drive flag off and stops the electric blower fan 42 and the brush motor 44.

At the startup of the electric vacuum cleaner 1, the above control operation alternately switches the rotary brush 25 between the positive rotation and the reverse rotation and drives the electric blower fan 42 in high-power operation, whereby the hair, lint and the like tangled the rotary brush 25 are untangled and removed therefrom. This permits the subsequent cleaning operation to be favorably performed in a state where the rotary brush 25 is free from the tangled hair, lint and the like.

In response to the input of the startup signal, the electric vacuum cleaner 1 performs the control operation of driving the rotary brush 25 into the positive and reverse rotations. However, the electric vacuum cleaner 1 may alternatively have an arrangement wherein a particular key (other than the five keys provided on the operation panel 30 of FIG. 2) is provided and wherein the controller 40 detects the depression of the particular key (Step S15) and executes the control operation of Steps S3 to S10 in response to the input of a signal from the particular key.

The operation of driving the rotary brush 25 into the positive and reverse rotations for untangling and removing the hair, lint and the like tangled about the rotary brush may also be performed at any other time such as whenever the suction force of the electric blower fan 42 is changed by depressing the "High/Mid/Low" key 32, or when the "Brush ON/OFF" key 33 is depressed to start the rotation of the rotary brush 25 or to stop the rotation of the rotary brush 25.

Referring to FIG. 8 to FIG. 14, the following description is made on an arrangement and a control operation for carrying out wipe off cleaning using the above-described electric vacuum cleaner 1 wherein a wet sheet is wound around the periphery of the rotary brush 25 of the suction device 10.

The "wet sheet" unit a cleaning sheet recently used mainly for cleaning wooden floors and the like of private houses and generally comprises unwoven fabric impregnated with water and alcohol. An example of a well-known cleaning sheet is "Quickle Wiper" (registered trademark in Japan). The wet sheet is attached to a special device (a rod having a rectangular attachment plate assembled to its end) and used for wiping the floor surface.

The present applicants have devised an arrangement which permits such a wet sheet to be attached to the electric vacuum cleaner thereby enabling the electric vacuum cleaner to perform also wipe off cleaning using the wet sheet. Such an arrangement has already been proposed by the present applicants (see Japanese Unexamined Patent Publication No. 2005-304954).

Unlike the proposal already made, this embodiment proposes an arrangement and a control method in which the wet sheet is wound about the rotary brush 25 disposed in the suction device 10 thereby permitting the electric vacuum cleaner to perform the wipe off cleaning using the wet sheet.

FIG. 8A to FIG. 8D are diagrams showing a procedure of attaching a wet sheet 50 to the suction device 10 for performing the wipe off cleaning operation.

As shown in FIG. 8A, the wet sheet 50 is spread on the floor surface 100 and the suction device 10 is placed on the wet sheet 50 in a manner that the rotary brush 25 is opposed to a place near a leading end of the wet sheet 50. In this state, the "Attach" key 34 on the operation panel 30 is depressed.

In response to this key operation, the rotary brush 25 and the electric blower fan 42 are driven in a predetermined mode, so that the wet sheet 50 is wound around the periphery of the rotary brush 25, as shown in FIG. 8B. More specifically, the rotary brush 25 is positively rotated at a predetermined rotational speed in response to the depression of the "Attach" key 34. Thus, the wet sheet 50 is drawn from its leading end side o be wound around the periphery of the rotating rotary brush 25. As shown in FIG. 8B, the wet sheet is wound in layers about the rotary brush 25.

The wet sheet 50 is impregnated with water and alcohol. When wound about the rotary brush 25, the wet sheet 50 is subjected to centrifugal force, which scatters some of the impregnated water and alcohol from the wet sheet 50. It is therefore desirable to operate the electric blower fan 42 so as to draw the released water and alcohol into the bend 21 through the communication opening 26 in order to prevent the water and alcohol from being scattered on the floor surface 100. It is not desirable that the suction force of the electric blower fan 42 at this time is so strong as to draw the water and alcohol scattered from the wet sheet 50 so far as into the cleaner body 2.

Therefore, the electric blower fan 42 preferably generates a minor suction force such that the released water and alcohol may be drawn through the communication opening 26 of the suction device 10 to a forward portion of the bend 21 and may be allowed to drop through small holes 51 formed in a lower side of the bend and to be captured by a moisture absorption member 52 disposed there.

Figure 8C:
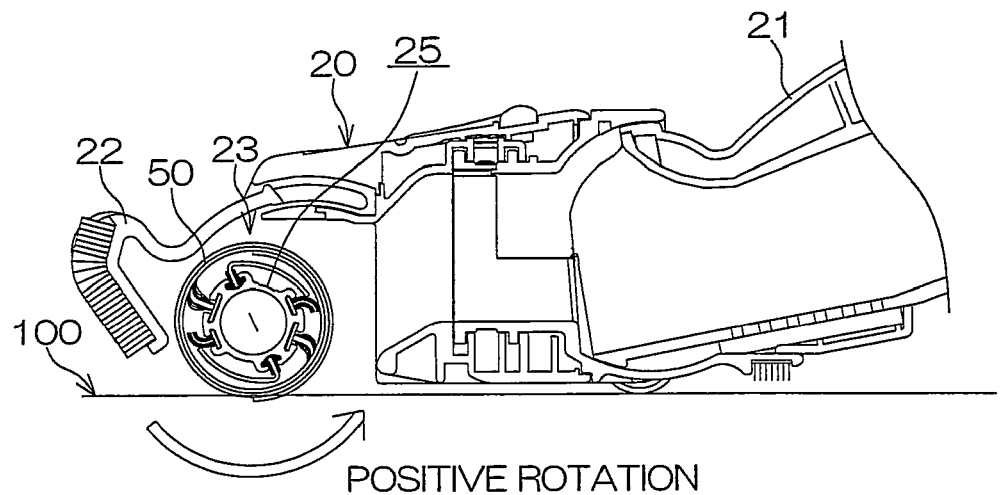
FIG. 8C is a diagram showing the procedure of attaching the wet sheet 50 to the suction device 10 for performing the wipe off cleaning.

After the wet sheet 50 is wound about the rotary brush 25, the rotary brush 25 is positively rotated at a predetermined rotational speed while a predetermined suction force is generated by the electric blower fan, whereby the wipe off cleaning of the floor surface 100 using the wet sheet 50 can be carried out, as shown in FIG. 8C. The wipe-off cleaning operation involves no scattering of water or alcohol from the wet sheet 50. The water and alcohol are scattered from the wet sheet 50 only when the wet sheet 50 is wound about the rotary brush 25.

At completion of the wipe-off cleaning operation, the "Detach" key 35 on the operation panel 30 is depressed. The controller 40 responds to this and is controlled to drive the rotary brush 25 into the alternating positive and reverse rotations. At the same time, the electric blower fan 42 is driven to generate the strong suction force.

Figure 8D:
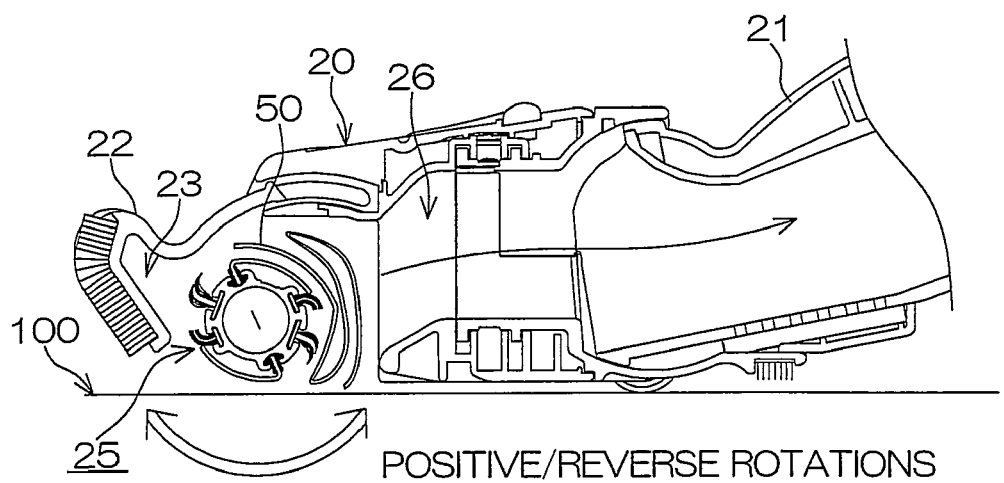
FIG. 8D is a diagram showing the procedure of attaching the wet sheet 50 to the suction device 10 for performing the wipe off cleaning.

It has been described that if the rotary brush 25, having hair and lint tangled thereabout, is driven in the positive and reverse rotations, the tangled hair and lint are untangled and removed therefrom. Similarly, if the rotary brush 25 is driven in the positive and reverse rotations and exposed to the strong suction force, the wet sheet wound about the rotary brush 25 is automatically released therefrom and drawn into the cleaner body 2, as shown in FIG. 8D.

FIG. 9 illustrates how the wet sheet 50 wound about the rotary brush 25 is released when the rotary brush 25 is driven in the positive and reverse rotations.

Figure 9A:
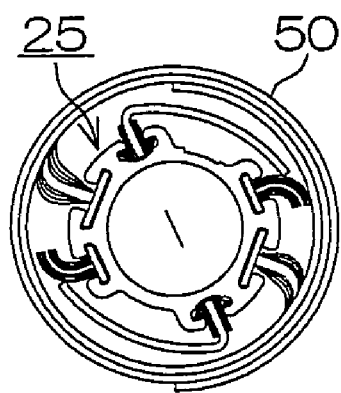
FIGS. 9A, 9B and 9C are a group of diagrams illustrating how the wet sheet 50 wound about the rotary brush 25 is unwound in conjunction with the positive and reverse rotations of the rotary brush 25.
Figure 9B:
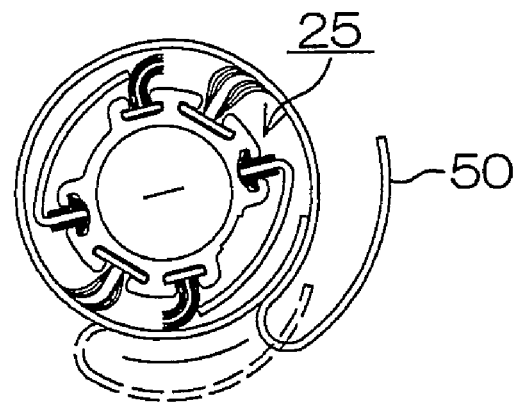
Figure 9C:
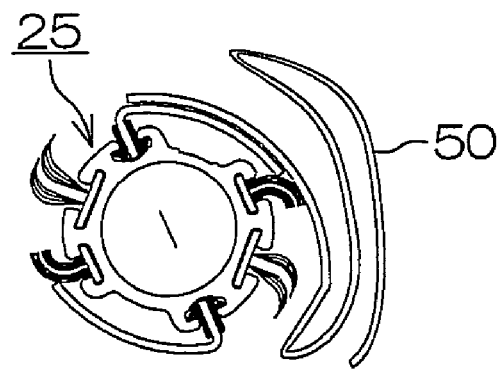

FIG. 9A shows the wet sheet 50 when the rotary brush 25 is positively rotated. FIG. 9B and FIG. 9C show how the wet sheet 50 is released from the periphery of the rotary brush 25 by alternately switching the rotary brush 25 between the positive rotation and the reverse rotation.

Figure 10:
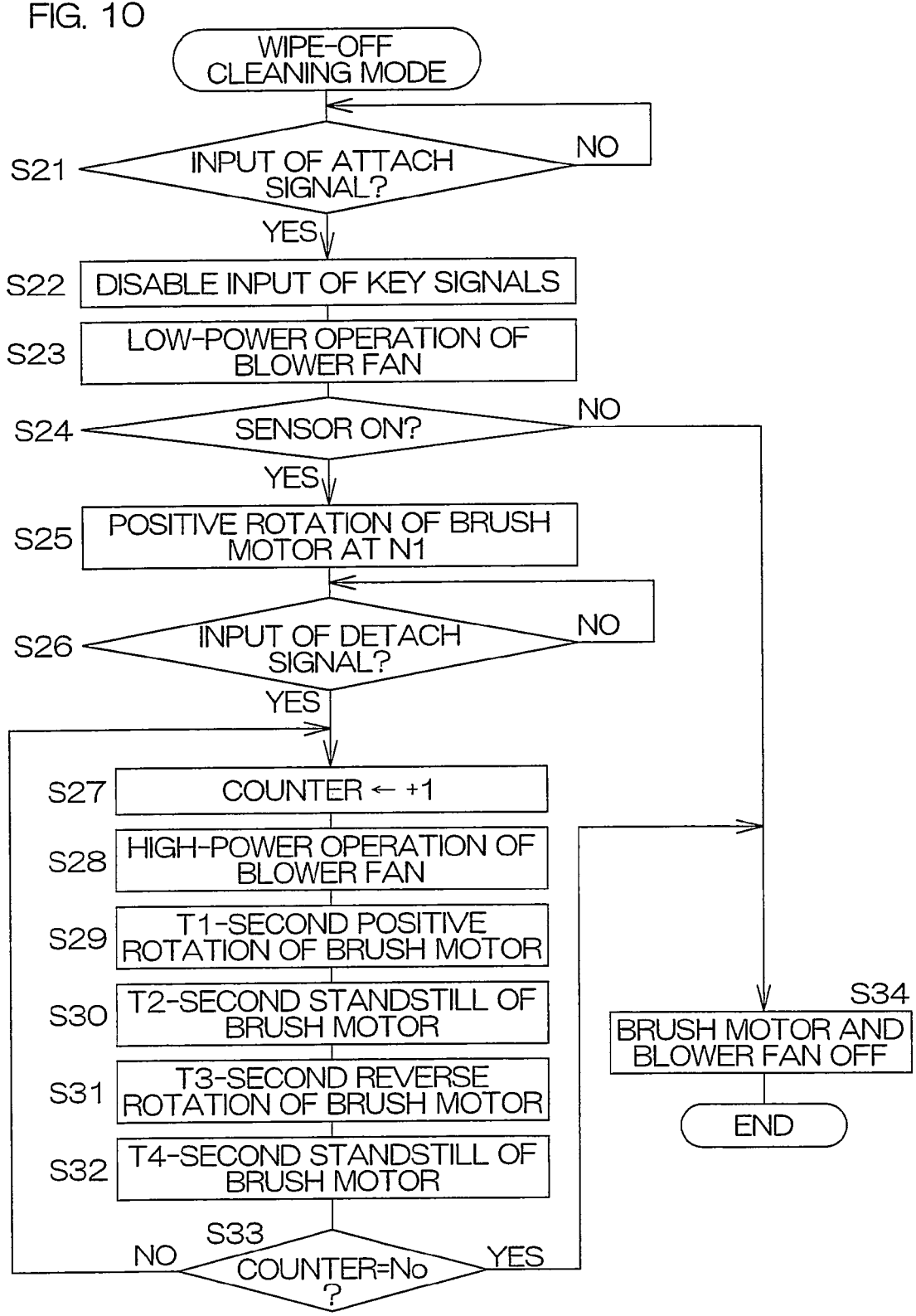
FIG. 10 is a flow chart showing the control contents of a wipe-off cleaning mode executed by the controller 40.

FIG. 10 is a flow chart showing the control contents of the wipe-off cleaning mode executed by the controller 40 shown in FIG. 3. Referring to the block diagram shown in FIG. 3 and FIG. 8A to FIG. 9 as needed, the control contents of the wipe-off cleaning mode are described according to the flow of FIG. 10.

In response to the depression of the "Attach" key 34 disposed on the operation panel 30, the controller 40 determines whether a signal from the "Attach" key 34 is inputted or not (Step S21).

If it is determined that the signal from the "Attach" key 34 is inputted, the input of signals from the "High/Mid/Low" key 32 and the "Brush ON/OFF" key 33 is disabled (Step S22) and the electric blower fan 42 is driven in low-power operation (Step S23). Then, the controller determines whether the paper bag sensor 45 is ON or not (Step S24).

The paper bag sensor 45 is switched off when a paper bag is loaded in the cleaner body 2. If the sensor 45 is on, the controller 40 determines that a plastic bin instead of the paper bag is loaded as a dust collector function and the wipe-off cleaning mode is carried on.

If the sensor 45 is not on, the controller 40 determines that the paper bag is loaded in the cleaner body 2 and hence, the wipe-off cleaning mode is disabled.

In this regard, a specific description will be made hereinlater.

Subsequently, the brush motor 44 is driven in positive rotation at a rotational speed N1 (Step S25).

It is noted here that the rotational speed N1 of the brush motor 44 at this time is of a level suitable for winding the wet sheet 50 around the periphery of the rotary brush 25 being rotated and for performing the wipe-off cleaning operation while rotating the wet sheet thus wound about the rotary brush. Specifically, the rotational speed N1 of the brush motor 44 is controlled such that the rotary brush 25 is rotated at a somewhat lower speed than a normal rotational speed thereof. Thus, the wet sheet 50 is wound about the rotary brush 25 and the rotary brush 25 with the wet sheet 50 wound thereabout is rotated to perform the wipe off cleaning of the floor or the like. At this time, the electric blower fan 42 generates the minor suction force and hence, dirt and dust on the surface to be cleaned 100 (wooden floor surface or the like) are wiped off by the wet sheet 50 and are also drawn into the cleaner body 2 and captured therein.

When the "Detach" key 35 is depressed at completion of the wipe off cleaning operation, the controller 40 determines the input of a detach signal (YES in Step S26) and performs a process of driving the brush motor 44 into positive and reverse rotations which includes: setting the counter to "1" (Step S27); setting the suction force of the electric blower fan 42 to high level (Step S28); driving the brush motor 44 into T1-second positive rotation (Step S29); placing the brush motor 44 into T2-second standstill (Step S30); driving the brush motor 44 into T3-second reverse rotation (Step S31); and placing the brush motor 44 into T4-second standstill (Step S32). Subsequently, the controller determines whether the counter indicates a predetermined value or not (Step S33). At this time, the counter indicates "1" and hence, the operation flow returns to Step S27, where the counter is incremented by "1" (Step S27) before performing the process of driving the brush motor 44 into the positive and reverse rotations.

The process of driving the brush motor 44 in the alternating positive and reverse rotations is repeated till the counter reaches a preset value, e.g., "5".

The rotary brush 25 is driven in the positive and reverse rotations by repeating the positive and reverse rotations of the brush motor 44, whereby the wet sheet 50 wound about the rotary brush 25 is unwound and released therefrom. The wet sheet 50 released from the rotary brush 25 is drawn into the cleaner body 2 by the strong suction force generated by the electric blower fan 42.

When it is determined in Step S33 that the counter reaches the preset value, the brush motor 44 and the electric blower fan 42 are turned off (Step S34) to terminate the wipe-off cleaning mode.

The cleaner body 2 shown in FIG. 1 is adapted for selective loading of the paper bag or a so-called cyclone unit, as the dust collector function, the cyclone unit comprising the plastic bin for centrifugally separating dirt and dust and storing the separated dirt and dust. Which of these dust collectors is loaded can be determined by unit of a built-in sensor 45. According to the above embodiment, the wipe-off cleaning mode using the wet sheet 50 is disabled if the paper bag is loaded. Hence, the wet sheet 50 is not drawn into the paper bag. Thus can be avoided a problem that the paper bag is broken due to the moisture from the wet sheet 50.

Referring to a cleaner body of a different type from the cleaner body 2 shown in FIG. 1, a specific description is made on an arrangement wherein how the sensor is used to differentiate the case where the paper bag is loaded in the cleaner body from the case where the cyclone unit is loaded therein.

Figure 11:
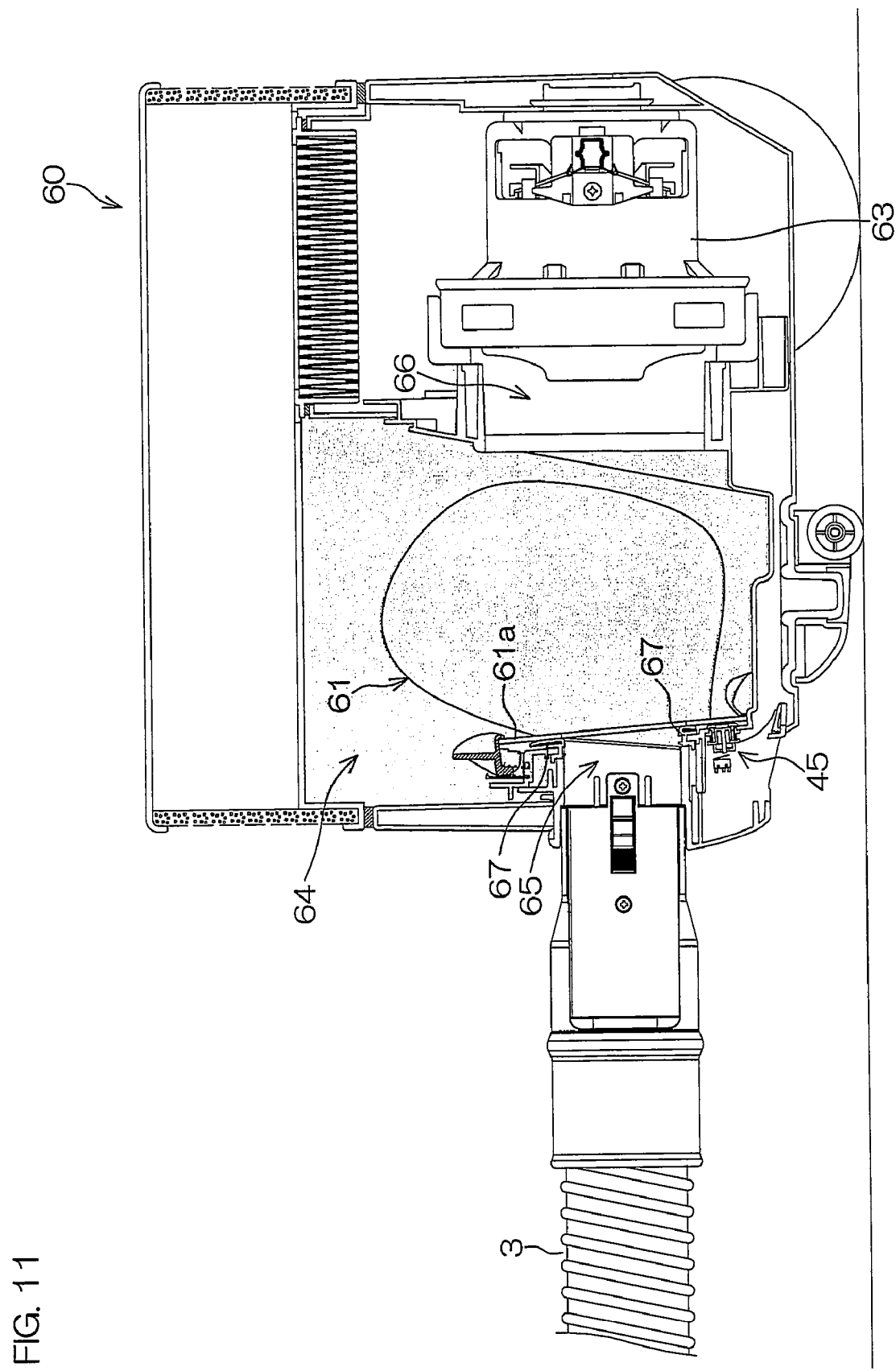
FIG. 11 is a sectional view of a cleaner body 60 having a paper bag 61 loaded therein.
Figure 12:
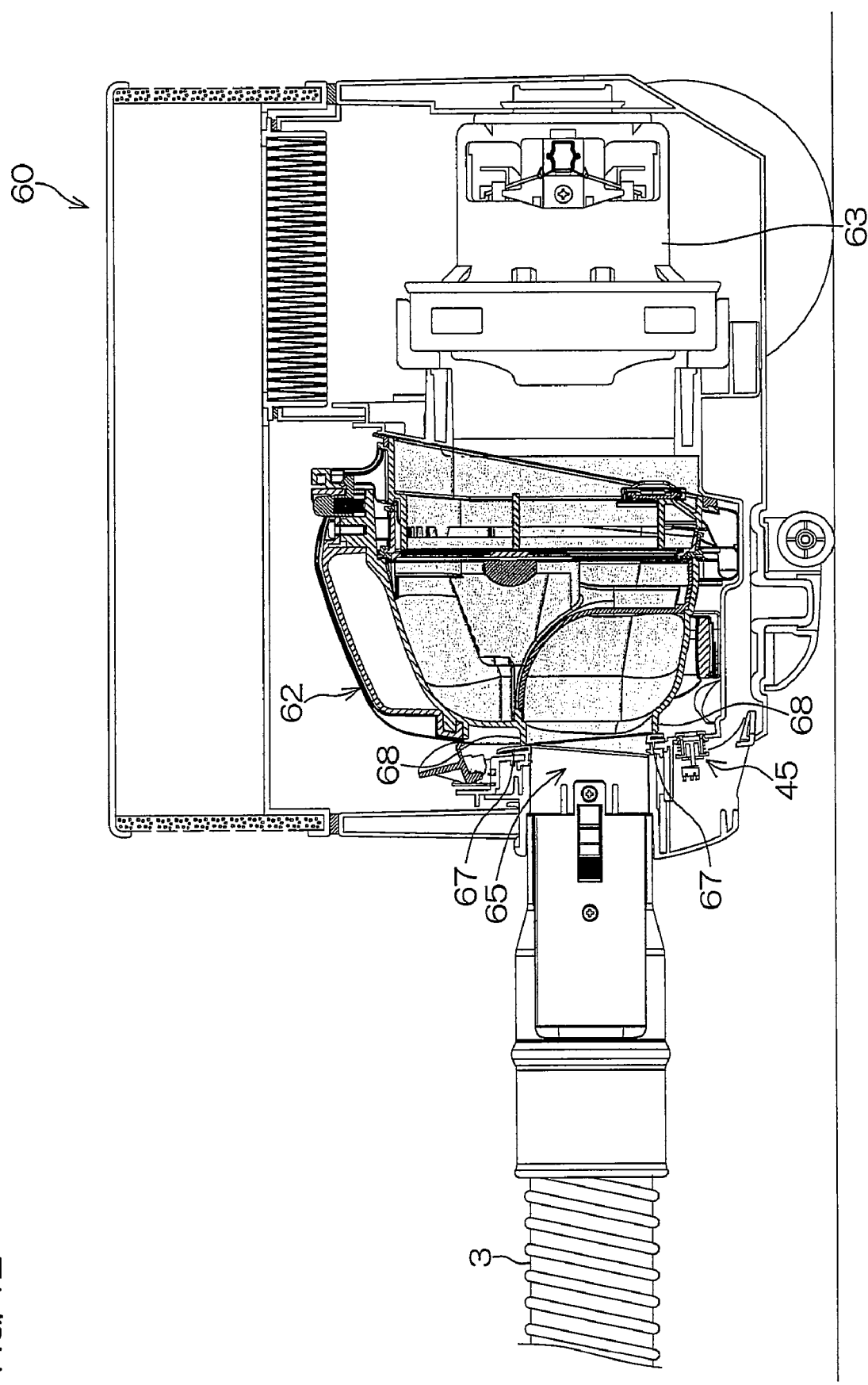
FIG. 12 is a sectional view of the cleaner body 60 having a cyclone unit 62 loaded therein.

FIG. 11 is a sectional view of a cleaner body 60 having a paper bag 61 loaded therein. FIG. 12 is a sectional view of the cleaner body 60 having a cyclone unit 62 loaded therein.

Referring to FIG. 11 and FIG. 12, the cleaner body 60 incorporates therein an electric blower fan 63. A dust collecting space 64 is formed on the front side of the electric blower fan 63. The dust collecting space 64 is hermetically sealed, so that air enters through an inlet 65, to which the suction hose 3 is attached, and is drawn by the blower fan 63 to flow through an exit 66 into the electric blower fan 63 without leaking from the dust collecting space 64. For this purpose, the inlet 65 is provided with, for example, a sealing packing 67 on its circumference.

In the case where the paper bag 61 is loaded, as shown in FIG. 11, a header 61a of the paper bag 61 is pressed against the sealing packing 67, whereby the inlet 65 is hermetically sealed on its circumference. When the electric blower fan 63 is operated, negative air pressure is created in the whole dust collecting space 64 (grayish area in the figure). The sensor 45 is disposed in this area.

On the other hand, in the case where the cyclone unit 62 is loaded, as shown in FIG. 12, an inlet 68 of the cyclone unit 62 is pressed against the sealing packing 67, so that the inlet 65 is sealed. The cyclone unit 62 has its internal space hermetically arranged. When the electric blower fan 63 is operated, therefore, the suction force thereof creates negative air pressure in the internal space of the cyclone unit 62 (the grayish area in the figure). However, the negative air pressure is not created in the whole dust collecting space 64.

Figure 13B:
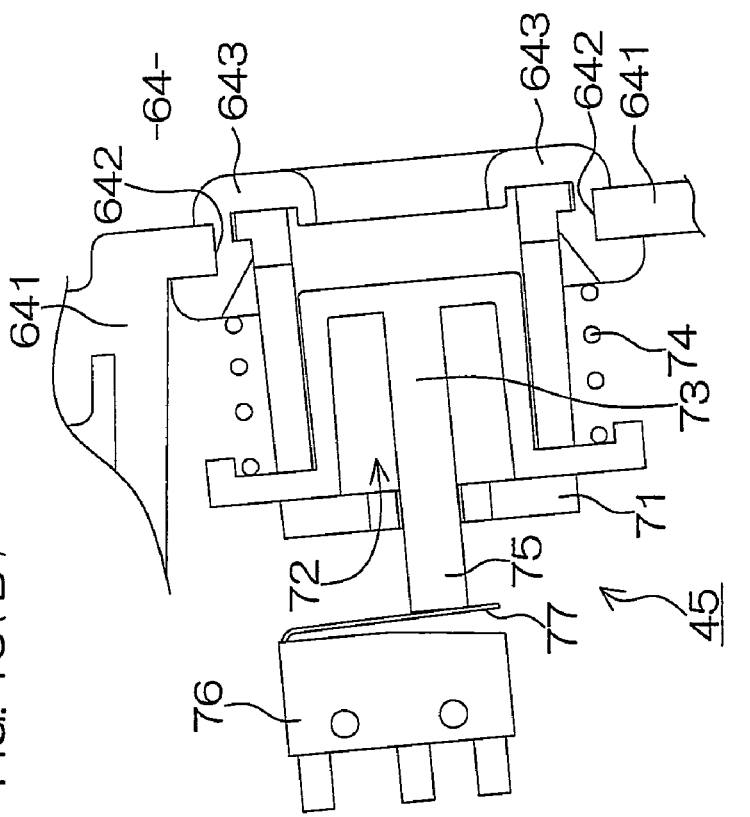
FIGS. 13A and 13B are a group of diagrams illustrative of an operation of a sensor 45.

Therefore, the state of the sensor 45 differs between the case where the paper bag 61 is loaded (FIG. 13A) and the case where the cyclone unit 62 is loaded (FIG. 13B).

Referring to FIG. 13, a wall 641 constituting the dust collecting space 64 is formed with a mounting hole 642 for the sensor 45. A holder 71 is fixed in the mounting hole 642 via a sealing packing 643. The holder 71 includes, for example, a cylindrical slide chamber 72, in which a piston 73 is slidably disposed. The piston 73 is urged by a coil spring 74 to slidably move leftward in the figure.

In a state where the piston 73 is slidably moved leftward as shown in FIG. 13B, an action rod 75 of the piston 73 projects leftward from the holder 71, thereby moving an actuator 77 of a micro switch 76 to switch on a micro switch 76, for example.

Figure 13A:
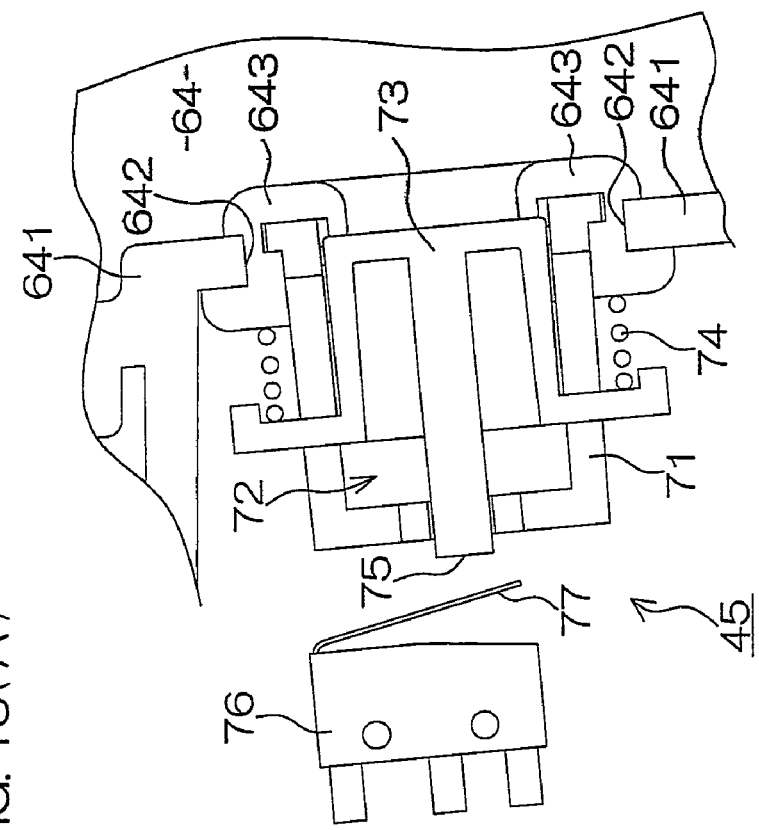

With the paper bag loaded therein, the whole dust collecting space 64 is under the negative air pressure, as shown in FIG. 13A. In the slide chamber 72, therefore, a space communicated with the dust collecting space 64 (a right-side space of the piston 73) is under the negative air pressure, which slidably moves the piston 73 rightward against the resilience of the coil spring 74, as shown in FIG. 13A. Accordingly, the action rod 75 moves away from the actuator 77, so that the micro switch 76 is switched off, for example.

With the cyclone unit loaded therein (FIG. 13B), the whole dust collecting space 64 is not under the negative air pressure, but only the space in the cyclone unit 62 is under the negative air pressure as described above. Accordingly, the piston 73 is not slidably moved rightward.

According to the above arrangement, whether the paper bag is loaded or not can be determined by checking the ON/OFF state of the micro switch 76.

The arrangement of the sensor 45 for determining whether the paper bag is loaded or not is not limited to that shown in FIG. 13. Any other arrangement may be adopted.

The "Attach" key 34 as the dedicated key is depressed to wind the wet sheet 50 about the rotary brush. However, there may possibly be a case where the user attempts to attach the wet sheet 50 by mistakenly depressing, for example, the "High/Mid/Low" key 32. The following description is made on a modification including a so-called failsafe mechanism which prevents the wet sheet 50 from being wound around if the user makes a mistake in key operation.

FIG. 14 is a group of right side views in vertical section of the suction device 10 equipped with the failsafe mechanism. The suction device 10 shown in FIG. 14 is provided with an engaging rib 55 which is disposed in the accommodating chamber 23 formed in the housing 20, as associated with an inlet of the communication opening 26. This engaging rib 55 is a blocking member for failsafe purpose. In this embodiment, the rotary bush 25 is rotated clockwise (reverse rotation) in the figure when the wet sheet 50 is wound about the rotary brush. When the rotary brush 25 is reversely rotated, the wet sheet 50 is favorably wound thereabout (FIG. 14B).

In the case of the positive rotation of the rotary brush 25, on the other hand, the wet sheet 50 cannot be wound about the rotary brush. The reason is as follows. If the user attempts to wind the wet sheet 50 about the rotary brush 25 in positive rotation, the wet sheet 50 guided by the rotary brush 25 hits against a lower end of the engaging rib 55, so that the wet sheet 50 is not guided along the periphery of the rotary brush 25 but guided toward the communication opening 26.

In the electric vacuum cleaner 1, the rotary brush 25 is positively rotated when the rotary brush 25 is driven in rotation by depressing the "Brush ON/OFF" key 33. Therefore, if the user attempts to attach the wet sheet 50 by mistakenly depressing the "Brush ON/OFF" key 33, the wet sheet 50 is not wound about the rotary brush 25 but is collected in the dust collecting bin.

FIG. 15 shows another example of the blocking member for failsafe purpose. According to an arrangement of FIG. 15, obliquely raised fabric 56 is disposed in the accommodating chamber 23 in a manner to oppose the periphery of the rotary brush 25. The obliquely raised fabric 56 has fur arranged in a manner that the fur is reversely raised up by the positively rotated rotary brush 25. Thus, the attempt to wind the wet sheet 50 about the rotary brush 25 in positive rotation is hampered (FIG. 15A).

In the case of the reverse rotation of the rotary brush 25, on the other hand, the action of winding the wet sheet 50 about the rotary brush 25 is not hampered, so that the wet sheet 50 is smoothly wound around the periphery of the rotary brush 25 (FIG. 15B).

It is also possible to prevent the winding of the wet sheet 50 about the positively rotated rotary brush 25 by using the obliquely raised fabric 56 in this manner.

FIG. 16 shows another example of the blocking member for failsafe purpose. A failsafe mechanism of FIG. 16 has an arrangement wherein the shutter 22 constituting the suction device 10 is formed with an air intake 57.

In a state where the electric blower fan operates to generate the suction force, the air is sucked through the suction port 24 while the air is secondarily sucked through the air intake 57. The air sucked through the air intake 57 flows along an upper side of the rotary brush 25 and from the left-hand side to the right-hand side in the figure.

If the user attempts to wind the wet sheet 50 about the rotary brush 25 in positive rotation, the suction air flow entering through the air intake 57 prevents the wet sheet 50 from being wound about the rotary brush 25 (FIG. 16A).

In the case of the reverse rotation of the rotary brush 25, on the other hand, the direction of winding the sheet around the periphery of the rotary brush 25 is the same as the direction of the suction air flow sucked through the air intake 57, so that the wet sheet 50 is favorably wound around the periphery of the rotary brush 25 (FIG. 16B).

As described with reference to FIG. 14 to FIG. 16, the suction device 10 incorporating the so-called failsafe mechanism can be implemented in the arrangement wherein the rotary brush 25 permits the wet sheet 50 to be wound around the periphery thereof when the rotary brush 25 is in the reverse rotation inverse of the positive rotation in which the rotary brush is driven during the normal cleaning operation, and wherein, at the same time, the blocking member (such as the engaging rib 55, the obliquely raised fabric 56 or the air intake 57) is provided for preventing the wet sheet from being wound about the rotary brush 25 positively rotated.

According to the embodiment as described above, the rotary brush 25 of the suction device 10 is equipped with the wing cloth 29, so that the hair, lint, wet sheet 50 and the like wound about the rotary brush 25 can be easily released therefrom by virtue of the action of the wing cloth 29. However, it is also possible to automatically release the hair, lint, wet sheet 50 and the like wound about the rotary brush 25 even if the rotary brush 25 is not equipped with the wing cloth 29. The reason is as follows. The hair, lint, wet sheet 50 and the like wound about the rotary brush 25 is gradually unwound by driving the rotary brush 25 in the alternating positive and reverse rotations in a predetermined manner and by simultaneously increasing the suction force of the electric blower to the high level. The hair, lint, wet sheet 50 and the like thus unwound is drawn by the strong suction force so as to be released from the rotary brush 25.

The following description is made on another embodiment of the invention with reference to the related drawings.

The same reference characters refer to the same components of the above embodiments and the description thereof is omitted.

Figure 17:
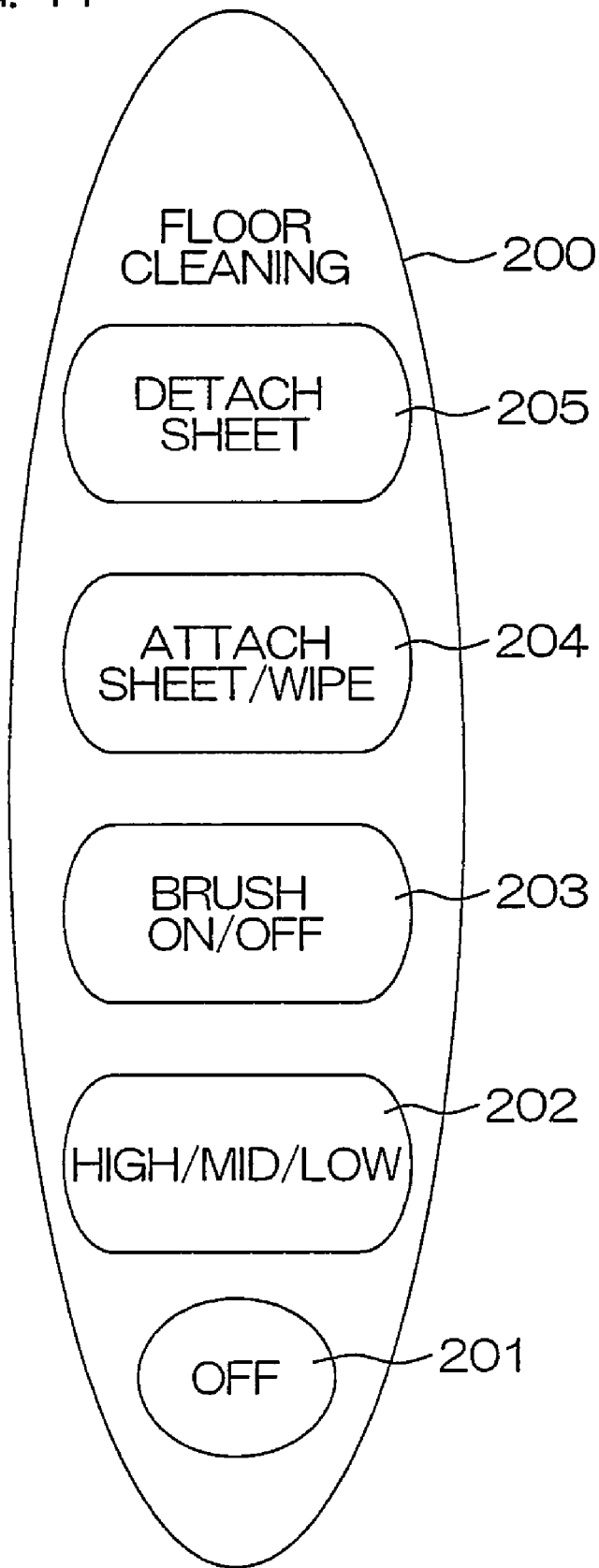
FIG. 17 is a plan view of an operation panel illustrative of another embodiment of the invention.

FIG. 17 is a plan view illustrative of an arrangement of an operation panel 200. Similarly to the foregoing embodiments, an operation panel 200 is disposed on the front side of the grip 8. The operation panel 200 has the following five keys arranged thereon.

An "OFF" key 201 is operated (depressed) to end the operation of the electric vacuum cleaner 1 (all the operations thereof). That is, the OFF key is used for inputting the shut-down signal to shut down power supply to the electric vacuum cleaner 1.

A "High/Mid/Low" key 202 is used for inputting a startup signal to the electric vacuum cleaner 1 and for inputting an operation mode (a level of the suction force of the electric blower fan 42).

A "Brush ON/OFF" key 203 is used for inputting a signal to switch on or off the rotary brush 25 (FIG. 4) incorporated in the housing 20 of the suction device 10 during the operation of the electric vacuum cleaner 1 (the operation of the electric blower fan 42).

An "Attach/Wipe" key 204 and a "Detach" key 205 are depressed when a wet sheet is wound around the periphery of the rotary brush 25 incorporated in the housing 20 of the suction device 10 to execute the wipe-off cleaning mode and when the wet sheet wound about the rotary brush is removed.

Figure 18:
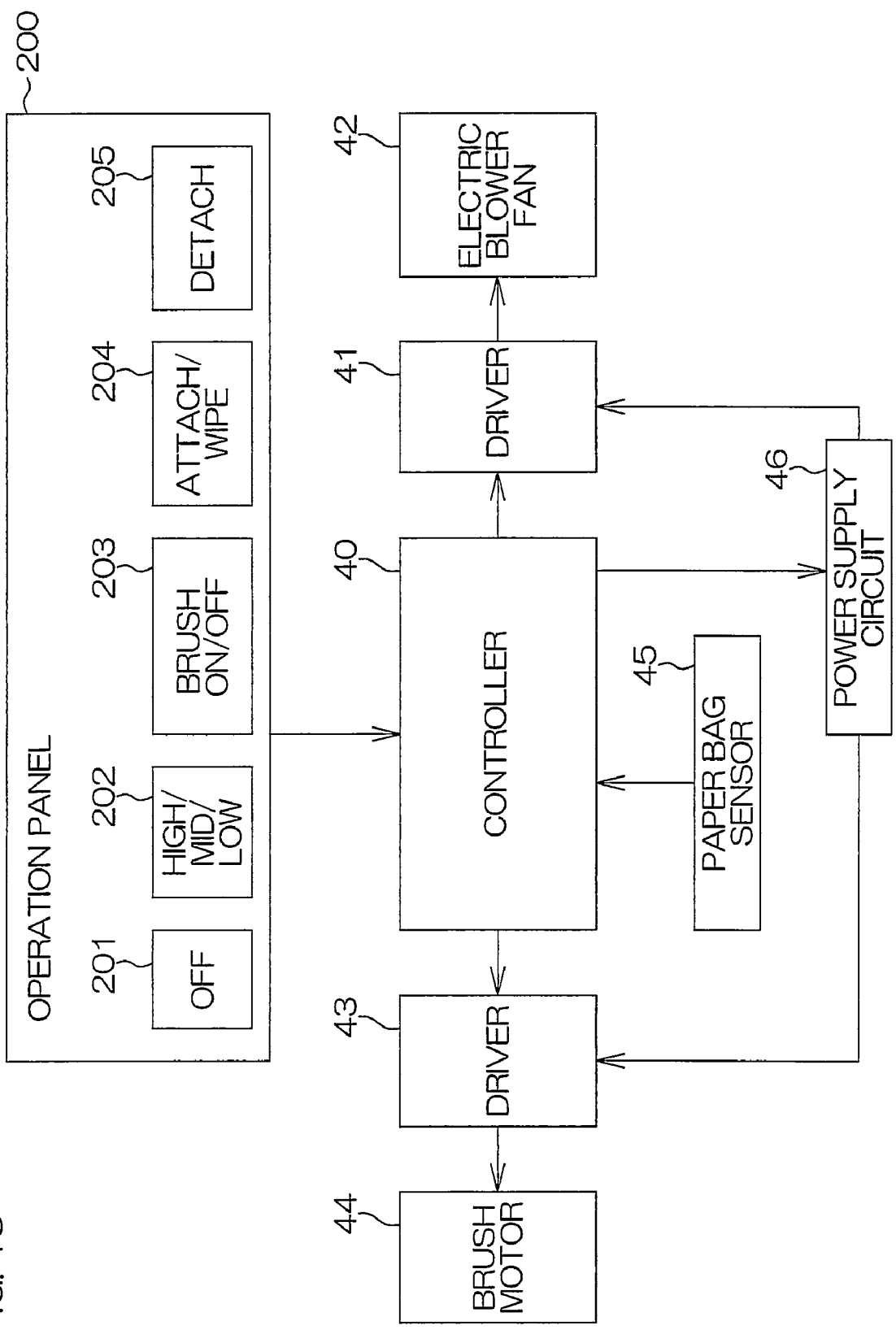
FIG. 18 is a block diagram showing an electrical configuration of an electric vacuum cleaner according to another embodiment of the invention.

FIG. 18 is a block diagram showing an electrical configuration of the electric vacuum cleaner 1.

Each of the signals from the five keys disposed on the operation panel 200, namely the "OFF" key 201, "High/Mid/Low" key 202, "Brush ON/OFF" key 203, "Attach/Wipe" key 204 and "Detach" key 205 is supplied to the controller 40. The controller 40 comprises electronic circuits such as CPU, ROM and RAM and functions as the control center of the electric vacuum cleaner 1. The controller 40 controls the driving of the electric blower fan 42 via the driver 41. The controller 40 also controls the driving of the brush motor 44 via the driver 43. The brush motor 44 operates to rotate the rotary brush 25 disposed in the housing 20 of the suction device 10.

The controller 40 receives the signal from the paper bag sensor 45. The cleaner body 2 is adapted for selective loading of the paper bag or the plastic bin as the dust collecting bin, the plastic bin centrifugally separating dirt and dust and storing the separated dirt and dust. Whether the paper bag is loaded or the plastic bin is loaded is determined based on the signal from the sensor 45. In a case where the paper bag is loaded, the controller 40 performs control to inhibit the use of the wet sheet, as will be described hereinlater The electric vacuum cleaner 1 further includes the power supply circuit 46, through which the electric power from the commercial power source is supplied to the drivers 41, 43.

As with the electric vacuum cleaner of the foregoing embodiments, the electric vacuum cleaner 1 according to this embodiment also automatically performs the control operation of driving the rotary brush 25 in the positive and reverse rotations in order to prevent hair, lint and the like from becoming tangled about the rotary brush 25, the control operation performed at a predetermined time and for a certain period of time. Such a control operation is executed by the controller 40 described with reference to FIG. 18.

Figure 19:
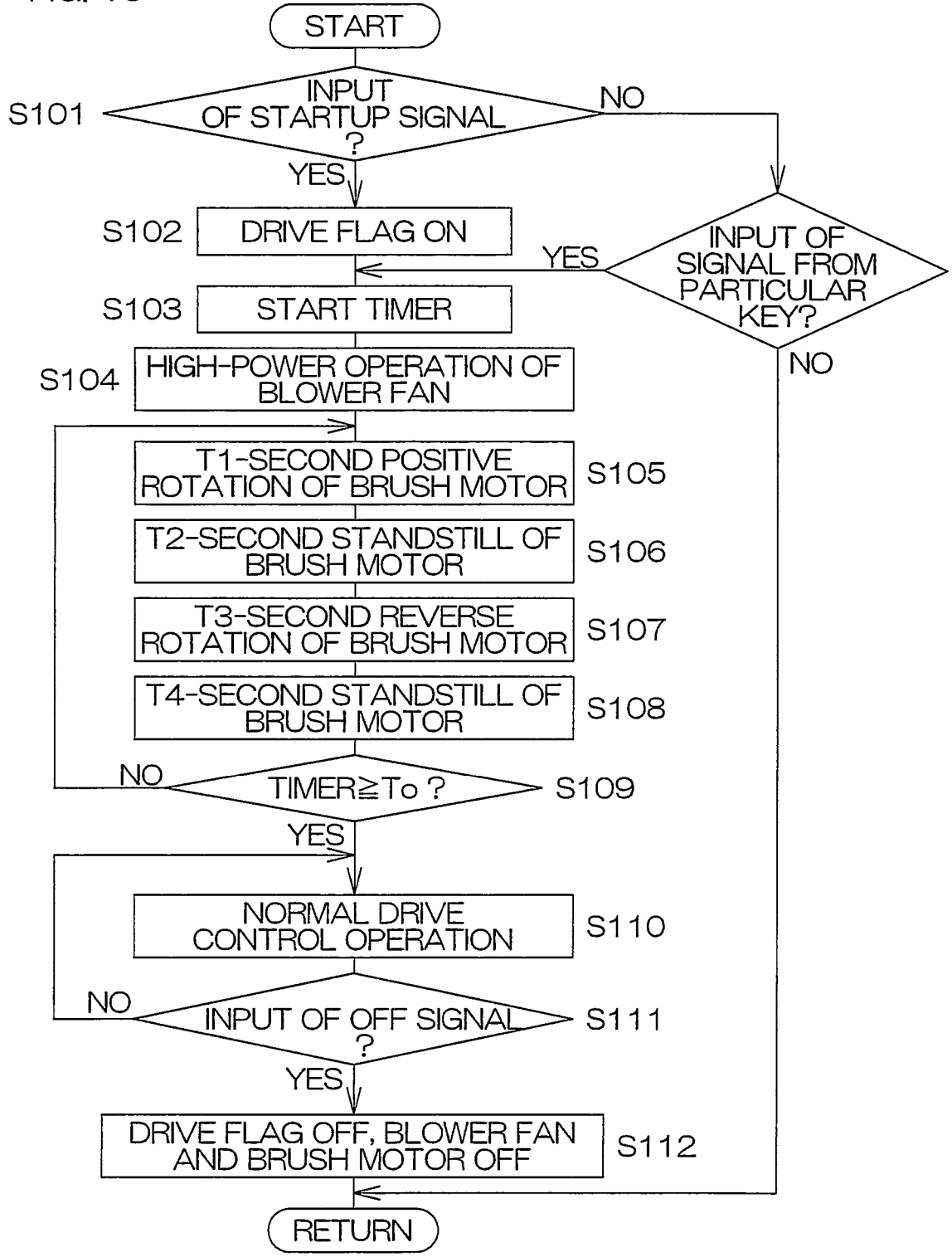
FIG. 19 is a flow chart showing an example of the steps of a control operation executed by the controller 40.

FIG. 19 is a flow chart showing an example of the steps of the control operation executed by the controller 40 shown in FIG. 18. As described with reference to FIG. 6 illustrating the foregoing embodiment, the chart shows the contents of the control operation for untangling and releasing the hair, lint and the like tangled about the rotary brush 25. The controller 40 also executes a control operation for releasing the sheet in a case where after doing the cleaning using the sheet wound around the periphery of the rotary brush 25, the user forgets to remove the sheet and goes on to clean the carpet or the like.

Referring to FIG. 18 and FIG. 6, description is made according to the flow of FIG. 19.

The controller 40 determines whether the startup signal is inputted or not (Step S101). In this embodiment, the startup signal is supplied to the controller by depressing the "High/Mid/Low" key 202, while signals directing high-power operation to med-power operation to low-power operation to high-power operation of the electric blower fan 42 are cyclically changed in this order according to the number of depressions of the "High/Mid/Low" key 202 and supplied to the controller.

Detecting the input of the startup signal, the controller 40 turns ON the drive flag disposed in, for example, the RAM (Step S102), starting the timer (Step S103) and driving the electric blower fan 42 in high-power operation (Step S104). That is, in this embodiment, the depression of the "High/Mid/Low" key 32 first performs the high-power operation of the electric blower fan regardless of the number of depressions of the key.

Subsequently, the brush motor 44 is driven in T1-second positive rotation (Step S105), followed by T2-second standstill (Step S106), T3-second reverse rotation (Step S107) and T4-second standstill (Step S108). This driving procedure is carried on till the timer counts a predetermined time T0 (Step S109).

An exemplary drive time may include T1=0.2 second, T2=0.2 second, T3=0.5 second, and T4=0.2 second. At the startup of the electric vacuum cleaner 1, this control operation alternately switches the rotary brush 25 between the positive rotation and the reverse rotation for T0 second. Thus, the hair and lint tangled about the rotary brush 25 may be untangled, as described with reference to FIG. 6. Further, the electric blower fan 42 is driven in high-power operation in conjunction with the positive and reverse rotations of the rotary brush 25. The strong suction force thus acts to ensure that the hair and lint untangled from the rotary brush 25 are drawn into the cleaner body 2. That is, the strong suction force is generated in conjunction with the operation of repeating the positive and reverse rotations of the rotary brush 25 for untangling the hair and lint therefrom. Therefore, the hair and lint can be released from the rotary brush 25.

In the case where after doing the cleaning using the sheet wound around the periphery of the rotary brush 25, the user forgets to remove the sheet, the remaining sheet is unwound by repeating the positive and reverse rotations of the rotary brush 25 and then is drawn by the strong suction force of the electric blower fun 42, as will be described hereinlater. Thus can be eliminated the problem caused by the user who forgets to remove the sheet and goes on to clean the carpet or the like using the electric vacuum cleaner with the sheet remaining on the rotary brush.

In this embodiment, the timer is started in Step S103 and determination is made in Step S109 as to whether the timer has counted T0 second or not. Alternatively, the timer may be replaced by a counter to count the number of times at which the operations of Steps S105 to S108 are performed. When the operations of Steps S105 to S108 are repeated a predetermined number of times (e.g., five times), the operation flow may proceed to Step S110.

The embodiment interposes the stop times T2, T4 in changeover times between the positive and reverse rotations of the rotary brush 25 in order to increase the durability of the brush motor 44 driving the rotary brush 25. However, the stop time may be omitted if the brush motor 44 is of a type which can ensure a desired service life even when the rotational direction thereof is consecutively changed without the stop time. The lengths of time T1, T2, T3, T4 are arbitrary.

Subsequently, the control operation proceeds to Step S110 to perform the normal drive control operation. Based on the number of depressions of the "High/Mid/Low" key 202 supplied together with the startup signal, the electric blower fan 42 is so driven as to generate a suction force corresponding to the input signal.

In the normal drive control operation, the rotary brush 25 is switched to the positive rotation or to standstill each time the "Brush ON/OFF" key 203 on the operation panel 200 is depressed. Such a normal drive control operation implements the cleaning by unit of the electric vacuum cleaner 1.

When the cleaning is finished, the user depresses the "OFF" key 201 on the operation panel 200. Detecting the input of the OFF signal (YES in Step S111), the controller 40 turns the drive flag off and stops the electric blower fan 42 and the brush motor 44.

At the startup of the electric vacuum cleaner 1, the above-described control operation alternately switches the rotary brush 25 between the positive rotation and the reverse rotation and drives the electric blower fan 42 in high-power operation, whereby the hair, lint and the like tangled about the rotary brush 25 are untangled and removed therefrom. This permits the subsequent cleaning operation to be favorably performed in a state where the rotary brush 25 is free from the tangled hair, lint and the like.

Further, the above control operation can eliminate the problem caused by the user who forgets to remove the sheet from the rotary brush 25 and goes on to clean the carpet or the like using the electric vacuum cleaner with the sheet remaining on the rotary brush.

In response to the input of the startup signal, the electric vacuum cleaner 1 performs the control operation of driving the rotary brush 25 into the positive and reverse rotations. However, the electric vacuum cleaner may also have an arrangement wherein a particular key (other than the five keys provided on the operation panel 200 of FIG. 17) is provided and wherein the controller 40 detects the depression of the key (Step S113) and executes the control operation of Steps S103 to S110 in response to the input of a signal from the particular key.

The operation of driving the rotary brush 25 in the positive and reverse rotations for untangling and removing the hair, lint and the like tangled about the rotary brush may also be performed at any other time such as whenever the suction force of the electric blower fan 42 is changed by depressing the "High/Mid/Low" key 202, or when the "Brush ON/OFF" key 203 is depressed to start the rotation of the rotary brush 25 or to stop the rotation of the rotary brush.

Referring to FIG. 20 to FIG. 23, the following description is made on an arrangement and a control operation for carrying out wipe off cleaning using the above-described electric vacuum cleaner 1 wherein a sheet is wound around the periphery of the rotary brush 25 of the suction device 10.

The "sheet" unit a dust sorbing sheet, such as floor wiping sheet, comprising fabric or paper and capable of sorbing dirt and dust.

The present applicants have devised an arrangement which permits such a sheet to be attached to the electric vacuum cleaner, thereby enabling the electric vacuum cleaner to perform also wipe off cleaning using the sheet. The arrangement has already been proposed by the present applicants (Japanese Unexamined Patent Publication No. 2004-222739).

This embodiment proposes an arrangement and a control method in which the sheet is wound about the rotary brush 25 disposed in the suction device 10, thereby permitting the electric vacuum cleaner to perform the wipe off cleaning using the sheet.

FIG. 20A to FIG. 20D are diagrams showing a procedure of attaching the sheet 50 to the suction device 10 for performing the wipe-off cleaning operation.

Figure 20A:
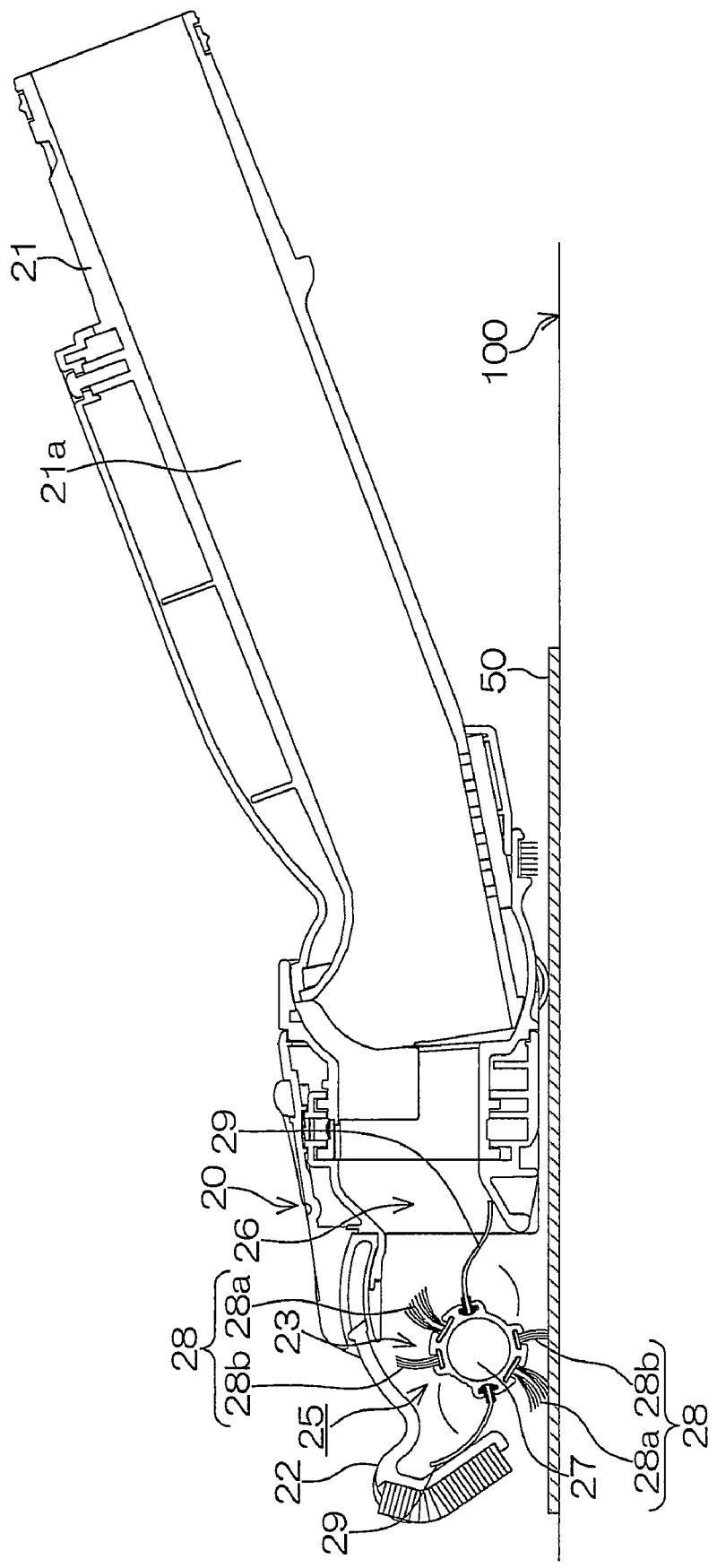
FIG. 20A is a diagram showing a procedure of attaching a sheet 50 to the suction device 10 for performing wipe off cleaning.

As shown in FIG. 20A, the sheet 50 is spread on the floor surface 100 and the suction device 10 is placed on the sheet 50 in a manner that the rotary brush 25 is opposed to a place near a leading end of the sheet 50. In this state, the "Attach/Wipe" key 204 on the operation panel 200 (see FIG. 17) is depressed.

In response to this key manipulation, the rotary brush 25 and the electric blower fan 42 are driven in a predetermined mode, so that the sheet 50 is wound around the periphery of the rotary brush 25, as shown in FIG. 20B. More specifically, the rotary brush 25 is positively rotated at a predetermined rotational speed in response to the depression of the "Attach/Wipe" key 204. Thus, the sheet 50 is drawn from its leading end side to be wound around the periphery of the rotating rotary brush 25. As shown in FIG. 20B, the sheet is wound in layers about the rotary brush 25.

The electric blower fan 42 is activated after the lapse of a predetermined length of time from the startup of the brush motor 44. The embodiment defines the predetermined length of time to be the amount of time elapsed from the startup of the brush motor 44 to the time when the sheet is wound in layers about the rotary brush 25. Specifically, the predetermined length of time is about 2 seconds.

If both the rotary brush 25 and the electric blower fan 42 are driven at the same time, the following problem may occur. When the sheet 50 is wound about the rotary brush 25, the sheet 50 is drawn by the electric blower fan 42, and particularly, a central part of the sheet opposing the communication opening 26 is drawn with the strong suction force, so that the sheet 50 may not be uniformly wound around the periphery of the rotary brush 25.

According to the embodiment, the problem that the suction force of the electric blower fan 42 interferes with the uniform winding of the sheet 50 can be eliminated because the electric blower fan 42 is activated after the sheet is wound about the rotary brush 25.

Figure 20C:
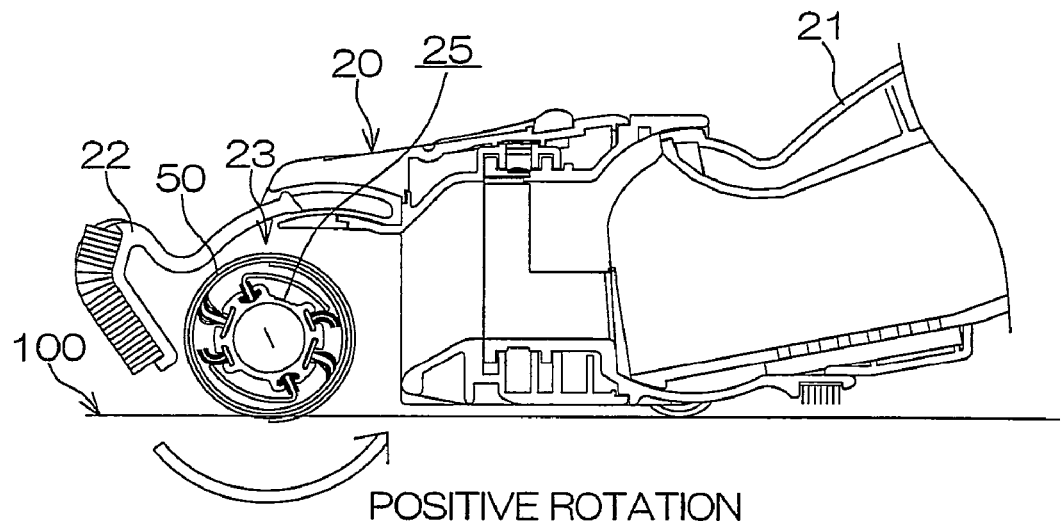
FIG. 20C is a diagram showing the procedure of attaching the sheet 50 to the suction device 10 for performing the wipe off cleaning.

After the sheet 50 is wound about the rotary brush 25, the rotary brush 25 is positively rotated at a predetermined rotational speed while a predetermined suction force is generated by the electric blower fan, whereby the wipe off cleaning of the floor surface 100 using the wet sheet 50 can be carried out, as shown in FIG. 20C.

In this state of the wipe-off cleaning operation, the operation of the "Brush ON/OFF" key 203 is enabled. There may be a case where the sheet 50 is irregularly positioned relative to the rotary brush 25 because the sheet 50 to be attached to the rotary brush is not properly wound but obliquely wound about the rotary brush 25 or because the sheet 50 is moved to one side during the wipe-off cleaning operation. If the rotary brush 25 is rotated in this case, the user may feel greater vibrations than usual.

In this case, the user operates the "Brush ON/OFF" key 203 to stop the rotation of the rotary brush 25 and perform the wipe off cleaning using the rotary brush in standstill. The rotary brush 25 is rotated due to friction resistance between the sheet and the surface to be cleaned, so that user can carry out the wipe off cleaning using the entire surface of the sheet 50.

The suction device 10 is provided with an unillustrated sensor for detecting contact with the surface to be cleaned. When the suction device 10 is lifted up from the surface to be cleaned, the rotary brush 25 is stopped to prevent the user from accidentally injuring fingers or the like due to contact with the rotary brush 25 in rotation. An arrangement wherein the electric blower fan 42 continues to operate when the suction device 10 is lifted up from the surface to be cleaned may potentially involve the following problem. In a case where an end of the sheet wound around the periphery of the rotary brush 25 positions near the communication opening 26, the sheet end may flip-flop to produce noises.

The embodiment stops the brush motor 44 and the electric blower fan 42 when the suction device 10 is lifted up from the surface to be cleaned, thereby preventing the noises caused by the flip-flop of the sheet end.

At completion of the wipe-off cleaning operation, the "Detach" key 205 on the operation panel 200 is depressed. The controller 40 responds to this and drives the electric blower fan 42 to generate the strong suction force. After the lapse of a predetermined length of time, the controller is controlled to drive the rotary brush 25 in the alternating positive and reverse rotations. The embodiment defines the predetermined length of time to the amount of time elapsed after the startup of the electric blower fan 42 to when the suction force of the electric blower fan 42 reaches the high level. Specifically, the predetermined length of time is about 2 seconds.

Figure 20D:
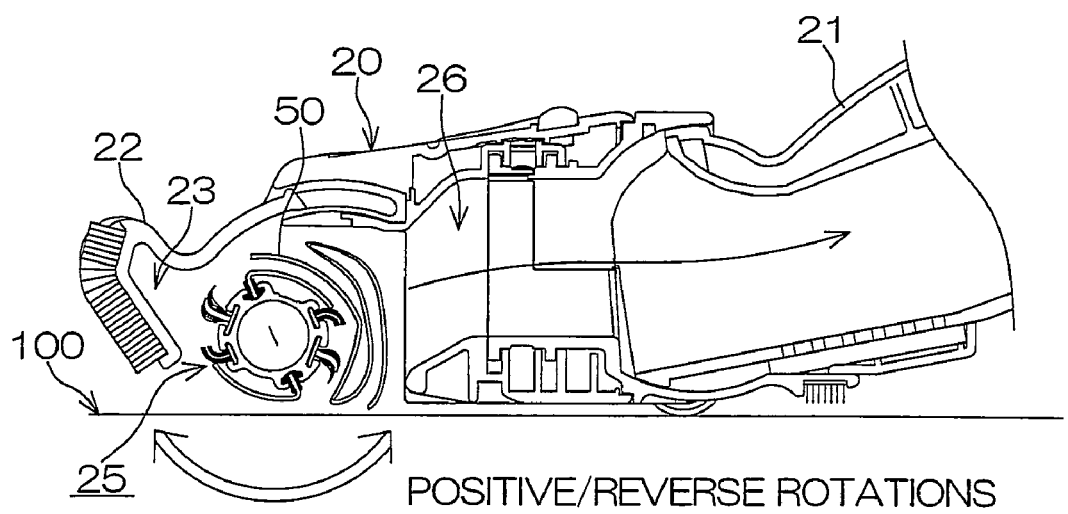
FIG. 20D is a diagram showing the procedure of attaching the sheet 50 to the suction device 10 for performing the wipe off cleaning.

It has been described that if the rotary brush 25, having hair and lint tangled thereabout, is driven in the positive and reverse rotations, the tangled hair and lint are untangled and released therefrom. Similarly, if the rotary brush 25 is driven in the positive and reverse rotations and exposed to the strong suction force, the sheet wound about the rotary brush 25 is automatically separated therefrom and drawn into the cleaner body 2, as shown in FIG. 20D.

FIG. 21 illustrates how the sheet 50 wound about the rotary brush 25 is released when the rotary brush 25 is driven in the positive and reverse rotations.

Figure 21A:
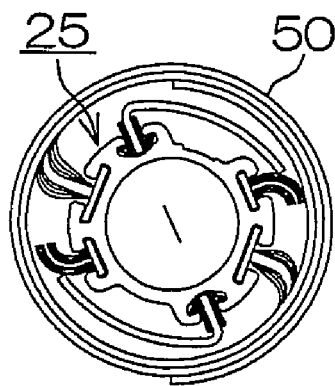
FIGS. 21A, 21B and 21C are a group of diagrams illustrating how the sheet 50 wound about the rotary brush 25 is unwound in conjunction with the positive and reverse rotations of the rotary brush 25.
Figure 21B:
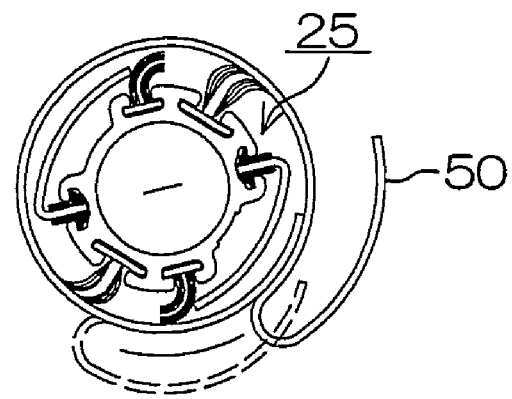
Figure 21C:
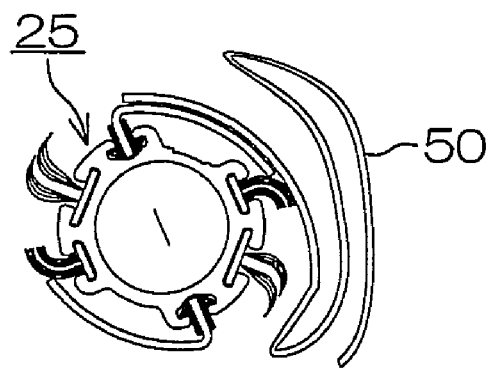

FIG. 21A illustrates the sheet 50 when the rotary brush 25 is positively rotated. FIG. 21B and FIG. 21C illustrate how the sheet 50 is released from the periphery of the rotary brush 25 by alternately switching the rotary brush 25 between the positive rotation and the reverse rotation.

Figure 22:
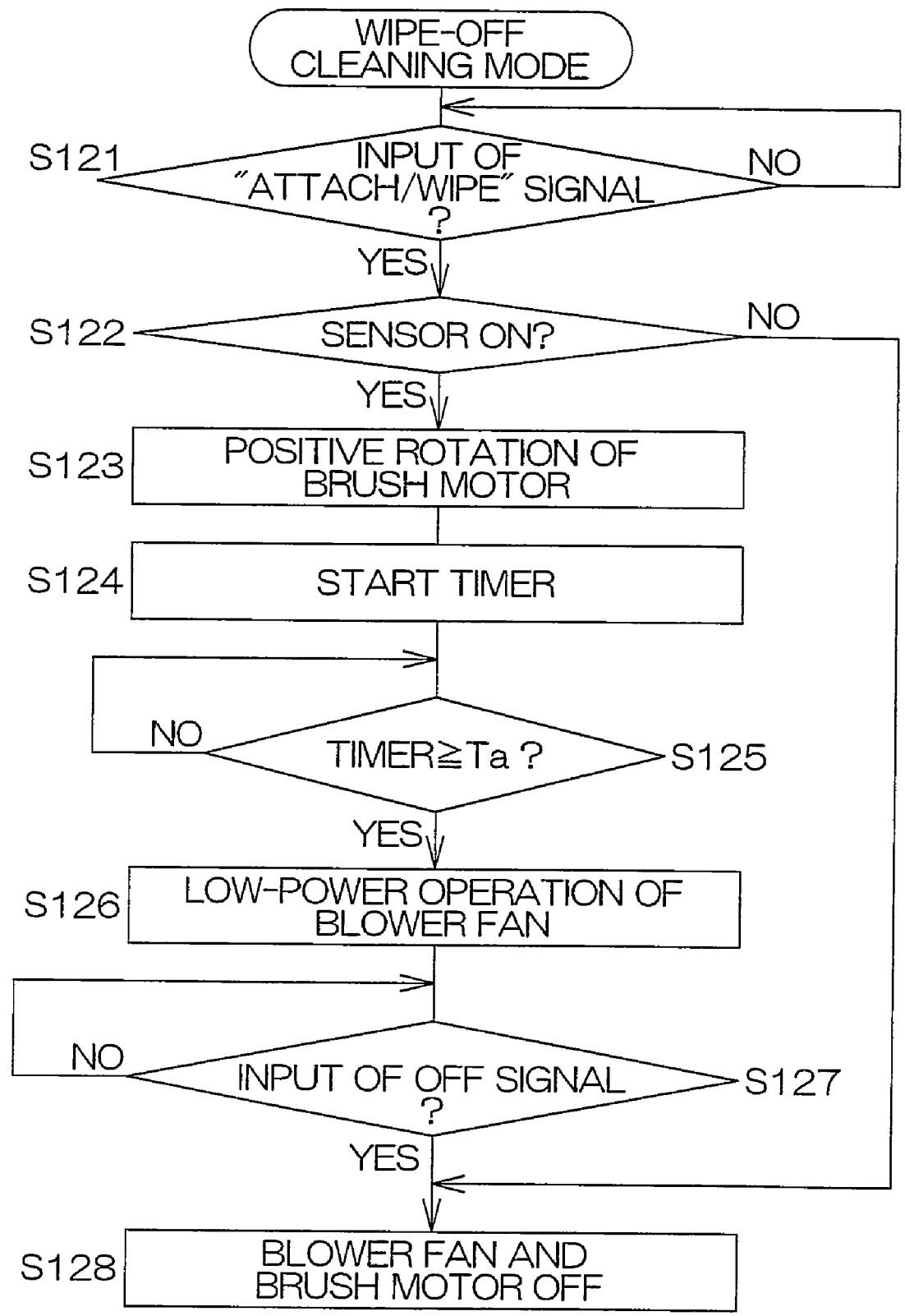
FIG. 22 is a flow chart showing the control contents of a wipe-off cleaning mode executed by the controller 40.
Figure 23:
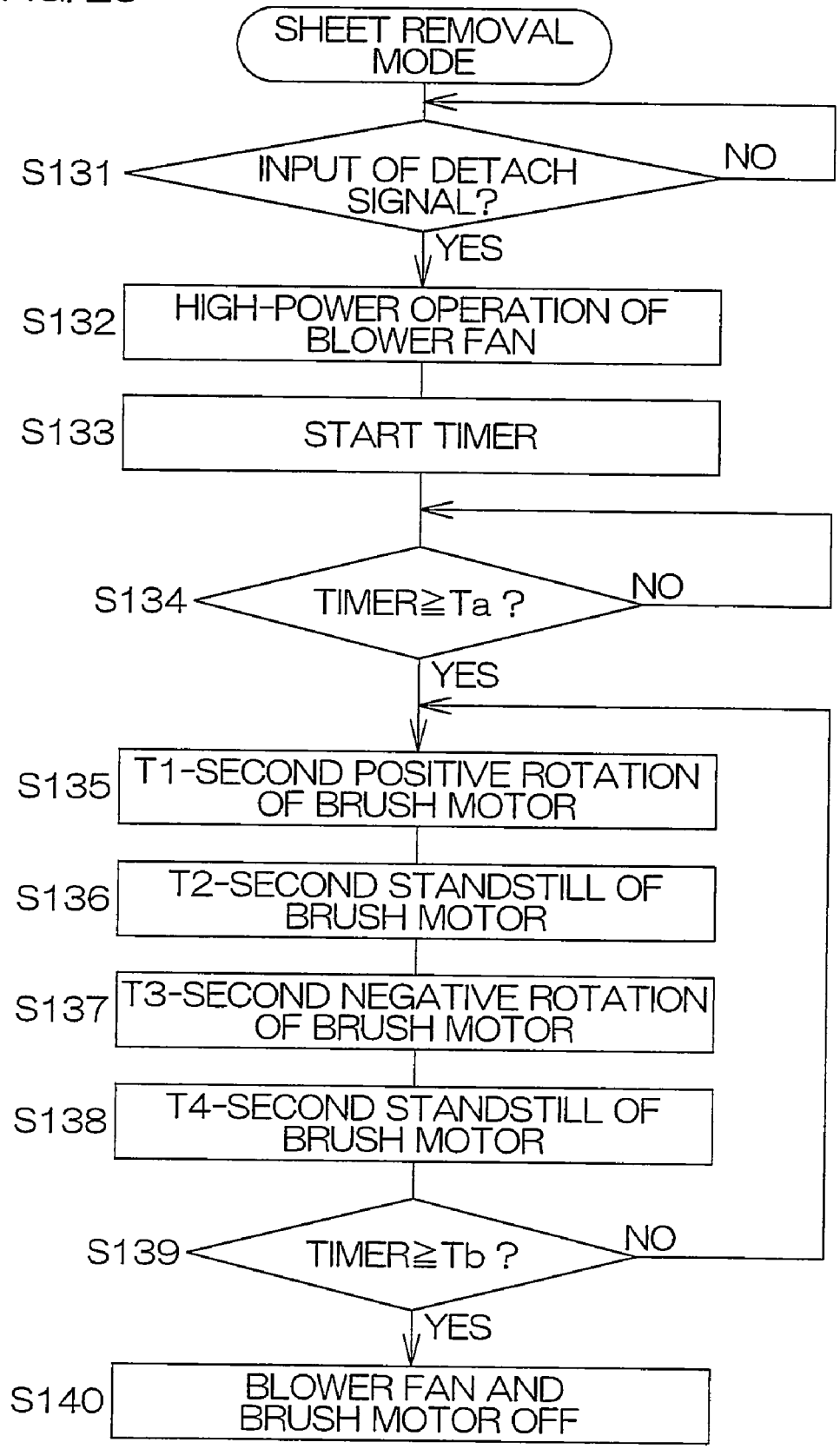
FIG. 23 is a flow chart showing the control contents of a sheet removal mode executed by the controller 40.

FIG. 22 and FIG. 23 are flow charts showing the control contents of a wipe-off cleaning mode and a sheet removal mode executed by the controller 40 shown in FIG. 18. Referring to the block diagram shown in FIG. 18 and FIG. 20A to FIG. 21 as needed, the control contents of the wipe-off cleaning mode are described according to the flow of FIG. 22 and FIG. 23.

In response to the depression of the "Attach/Wipe" key 204 disposed on the operation panel 200, the controller 40 determines whether a signal from the "Attach/Wipe" key 204 is inputted or not (Step S121).

If it is determined that the signal from the "Attach/Wipe" key 204 is inputted, the input of signals from the "High/Mid/Low" key 202 and the "Brush ON/OFF" key 203 is disabled and determination is made as to whether the paper bag sensor 45 is ON or not (Step S122).

The paper bag sensor 45 is switched off when a paper bag is loaded in the cleaner body 2. If the sensor 45 is ON, the controller determines that a plastic bin instead of the paper bag is loaded as the dust collector function and the wipe-off cleaning mode is carried on.

If the sensor 45 is not ON, the controller determines that the paper bag is loaded and hence, the wipe-off cleaning mode is disabled.

Subsequently, the brush motor 44 is driven in positive rotation at a rotational speed N1 (Step S123).

It is noted here that the rotational speed N1 of the brush motor 44 is of a level suitable for winding the sheet 50 around the periphery of the rotary brush 25 being rotated and for performing the wipe-off cleaning operation while rotating the sheet thus wound about the rotary brush. Specifically, the rotational speed N1 of the brush motor 44 is controlled such that the rotary brush 25 is rotated at a somewhat lower speed than a normal rotational speed thereof. Thus, the sheet 50 is wound about the rotary brush 25.

The operation of winding the sheet 50 about the rotary brush 25 may potentially involve the following problem. In this operation, the sheet 50 may be wound about the rotary brush as displaced to one side. Such a sheet is more likely to cause greater vibrations of the rotary brush as compared with a case where the rotary brush is free from the sheet 50. Such a sheet also presents a great contact resistance on the surface to be cleaned, increasing load on the brush motor 44.

As a solution to this problem, the rotary brush 25 with the sheet 50 wound thereabout is so controlled as to rotate at the lower rotational speed than the normal speed.

Subsequently, the timer is started (Step S124) and determination is made as to whether or not the timer indicates the lapse of a length of time, more specifically about 2 seconds, required for winding up the sheet 50 about the rotary brush 25 (Step S125). If the predetermined length of time has elapsed, the electric blower fan 42 is driven in low-power operation (Step S126) and the wipe off cleaning of the floor or the like is performed. During the wipe-off cleaning operation, the electric blower fan 42 generates the minor suction force and hence, dirt and dust on the surface to be cleaned 100 (wooden floor surface or the like) are not only wiped off by the sheet 50 but also drawn into the cleaner body 2 and captured therein.

When the wipe off cleaning is finished, the user depresses the "OFF" key 201 on the operation panel 200. Detecting the input of the OFF signal (YES in Step S127), the controller 40 stops the electric blower fan 42 and the brush motor 44.

Next, description is made on the sheet removal mode with reference to FIG. 23.

When the wipe off cleaning is finished and the "Detach" key 205 is depressed, the controller 40 determines the input of a detach signal (YES in Step S131) and increases the suction force of the electric blower fan 42 to the high level (Step S132). The controller determines whether or not a predetermined length of time has elapsed from the startup of the electric blower fan 42 (Steps S133 and S134). The embodiment defines the predetermined length of time to the amount of time required for increasing the suction force of the electric blower fan 42 to the high level from the startup of the electric blower fan 42. Specifically, the predetermined length of time is about 2 seconds. If the predetermined length of time has elapsed, the controller performs a process of driving the brush motor 44 in the positive and reverse rotations wherein the brush motor 44 is driven in T1-second positive rotation (Step S135), followed by T2-second standstill (Step S136), T3-second reverse rotation (Step S137) and T4-second standstill (Step S138). Subsequently, the controller determines whether the timer indicates the lapse of the predetermined length of time or not (Step S139).

The brush motor 44 repeats the alternating positive and reverse rotations for a predetermined period of time from the startup thereof, for example, 5 seconds.

The rotary brush 25 is driven in the positive and reverse rotations by the repeated positive and reverse rotations of the brush motor 44, whereby the sheet 50 wound about the rotary brush 25 is unwound and released therefrom. The sheet 50 thus released from the rotary brush 25 is drawn into the cleaner body 2 by the strong suction force of the electric blower fan 42.

If it is determined in Step S139 that the predetermined length of time has elapsed, the brush motor 44 and the electric blower fan 42 are turned off (Step S140) to terminate the sheet removal mode.

The cleaner body 2 shown in FIG. 1 is adapted for selective loading of the paper bag or the so-called cyclone unit, as the dust collector function, the cyclone unit comprising the plastic bin centrifugally separating dirt and dust and storing the centrifugally separated dirt and dust. Which of these dust collectors is loaded may be determined by way of the built-in sensor 45. According to the above embodiment, the wipe-off cleaning mode using the sheet 50 is disabled in the case where the paper bag is loaded. Hence, the sheet 50 is not drawn into the paper bag. This leads to the prevention of problems that the paper bag is filled up faster than usual due to the sheet 50 thus captured in the bag and that the sheet 50 constitutes airflow resistance to lower the suction force.

It has been described in the foregoing embodiments that the rotary brush 25 of the suction device 10 is equipped with the wing cloth 29 and hence, the hair, lint, sheet 50 and the like wound about the rotary brush 25 can be easily released therefrom by virtue of the action of the wing cloth 29. However, it is also possible to automatically release the hair, lint, sheet and the like wound about the rotary brush 25 even if the rotary brush 25 is not equipped with the wing cloth 29. The reason is as follows. The hair, lint, sheet and the like wound about the rotary brush 25 is gradually unwound by alternately switching the rotary brush 25 between the positive rotation and the reverse rotation in a predetermined manner and by simultaneously increasing the suction force of the electric blower to the high level. The hair, lint, sheet and the like thus unwound is drawn by the strong suction force so as to be released from the rotary brush 25.

In the case of the wipe-off cleaning operation using the wet sheet wound about the rotary brush, the following problem may be encountered. In the course of the cleaning operation, the wet sheet gradually dries at surface, losing its effect. The advantage of the wet sheet consists in the capability of easily capturing fine dirt and dust by virtue of the moisture thereof, or its higher dust sorbability than that of a dry sheet. Therefore, as the wet sheet loses moisture from its surface, the effect and efficiency of the wipe off cleaning are lowered. However, the inner side of the wet sheet wound about the rotary brush contains a sufficient amount of moisture. It is therefore desirable to effectively utilize the moisture.

The following approach may be employed for this purpose. At the start of cleaning operation, the rotary brush 25 is rotated at the lowest rotational speed in order to prevent the water from being released from the wet sheet and drawn into the cleaner body. As the wet sheet loses moisture from its outer side, the rotational speed of the rotary brush 25 is increased so as to utilize centrifugal force for transferring the moisture from the inner side to the outer side of the sheet.

Figure 24:
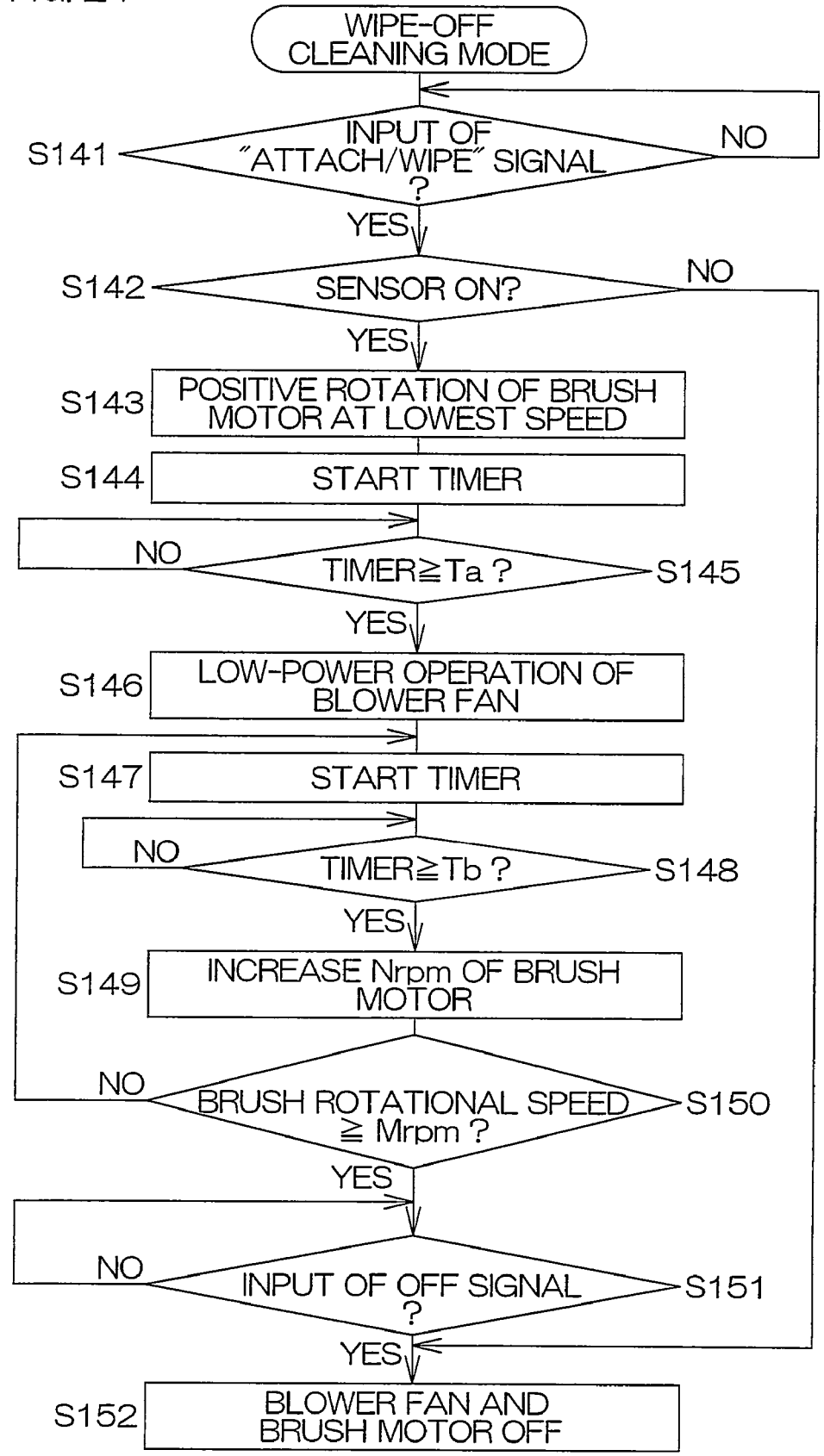
FIG. 24 is a flow chart showing the control contents of another wipe-off cleaning mode executed by the controller 40.

FIG. 24 is a flow chart showing the contents of a control operation executed by the controller 40 for gradually increasing the rotational speed of the rotary brush 25 during the wipe-off cleaning mode. Referring to the block diagram shown in FIG. 18 and FIG. 20A to FIG. 21 as needed, the control contents of the wipe-off cleaning mode are described according to the flow of FIG. 24.

In response to the depression of the "Attach/Wipe" key 204 disposed on the operation panel 200, the controller 40 determines whether the signal from the "Attach/Wipe" key 204 is inputted or not (Step S141).

If it is determined that the signal from the "Attach/Wipe" key 204 is inputted, the input of signals from the "High/Mid/Low" key 202 and the "Brush ON/OFF" key 203 is disabled and determination is made as to whether the paper bag sensor 45 is ON or not (Step S142).

The paper bag sensor 45 is switched off when a paper bag is loaded in the cleaner body 2. If the sensor 45 is ON, the controller determines that a plastic bin instead of the paper bag is loaded as the dust collector function and the wipe-off cleaning mode is carried on.

If the sensor 45 is not ON, the controller determines that the paper bag is loaded and hence, the wipe-off cleaning mode is disabled.

Subsequently, the brush motor 44 is driven in positive rotation at the lowest rotational speed N1 (Step S143).

It is noted here that the rotational speed N1 of the brush motor 44 at this time is of a level suitable for winding the wet sheet 50 around the periphery of the rotary brush 25 being rotated, for performing the wipe-off cleaning operation while rotating the wet sheet thus wound about the rotary brush and for preventing much water from being released from the wet sheet wound about the rotated brush. Specifically, the rotational speed N1 of the brush motor 44 is controlled such that the rotary brush 25 is rotated at a somewhat lower speed than the normal rotational speed thereof. Thus, the wet sheet 50 is wound about the rotary brush 25.

The operation of winding the wet sheet 50 about the rotary brush 25 may potentially involve the following problem. In this operation, the wet sheet 50 may be wound about the rotary brush as displaced to one side. Such a sheet is more likely to cause greater vibrations of the rotary brush as compared with a case where the rotary brush is free from the wet sheet 50. Such a sheet also presents a great contact resistance on the surface to be cleaned, increasing the load on the brush motor 44.

As a solution to this problem, the rotary brush 25 with the wet sheet 50 wound thereabout is so controlled as to rotate at the lower rotational speed than the normal speed.

Subsequently, the timer is started (Step S144) and determination is made as to whether or not the timer indicates the lapse of a length of time, more specifically about 2 seconds, required for winding up the wet sheet 50 about the rotary brush 25 (Step S145). If the predetermined length of time has elapsed, the electric blower fan 42 is driven in low-power operation (Step S146) and the wipe off cleaning of the wooden floor or the like is performed. During the wipe-off cleaning operation, the electric blower fan 42 generates the minor suction force and hence, dirt and dust on the surface to be cleaned 100 (wooden floor surface or the like) are not only wiped off by the wet sheet 50 but also drawn into the cleaner body 2 and captured therein.

Subsequently, the timer is started (Step S147). After the lapse of a length of time to cause the wet sheet 50 to get dry at its surface, specifically about 10 seconds from the start of the cleaning operation (Step S148), the rotational speed of the brush motor 44 is increased (Step S149). The rotational speed of the rotary brush 25 is increased by increasing the rotational speed of the brush motor 44. Hence, the centrifugal force is increased, so that the moisture in the inner side of the wet sheet 50 wound about the rotary brush 25 is transferred to the surface thereof. The moisture so transferred to the sheet surface is utilized for carrying on the wipe-off cleaning operation.

The wipe-off cleaning operation based on the effective use of the moisture in the inner side of the wet sheet 50 is carried on by repeating Steps S147 to S149. When the rotational speed of the brush motor 44 is increased to such a level that the rotary brush with the wet sheet 50 wound thereabout does not cause significant vibrations, the increase of the rotational speed of the brush motor 44 is terminated (Step S150).

The lowest rotational speed of the brush motor 44 in Step S143, the increased rotational speed of the brush motor 44 made in Step S148, the number of times to repeat Steps S147 to S149, the rotational speed of the brush motor 44 at which the increase of the rotational speed of the brush motor 44 ends in Step S150 are properly set according to an arrangement adopting the control contents.

When the wipe off cleaning is finished, the user depresses the "OFF" key 201 on the operation panel 200. Detecting the input of the OFF signal (YES in Step S151), the controller 40 stops the electric blower fan 42 and the brush motor 44.

The control contents may assume a case where in place of the wet sheet, a dust sorbing sheet, such as floor wiping sheet, is wound about the rotary brush 25 for performing the wipe off cleaning. In this case, it is unnecessary to gradually increase the rotational speed of the brush motor 44 because water is not scattered from the sheet.

Accordingly, the following arrangement can be employed. A moisture sensor for detecting moisture is disposed in the suction device 10 at a suitable place on the flow path of sucked air, such as the bend 21. The above-described control contents are executed in a case where the moisture sensor detects moisture after the lapse of a predetermined length of time from when the sheet 50 is wound about the rotary brush. In a case where the moisture sensor does not detect any moisture, on the other hand, the operation flow proceeds to Step S150 skipping Steps S147 to S149 for gradually increasing the rotational speed of the brush motor 44.

The invention is not limited to the various embodiments described above, and changes and modifications can be made thereto without departing from the scope of the appended claims.

What is claimed is:

1. An electric vacuum cleaner, comprising:
  a suction device including a housing having a suction port opposed to a surface to be cleaned, a rotary brush disposed in the housing and having a periphery partially facing into the suction port, a motor incorporated in the housing and driving the rotary brush into rotation, and a cylindrical bend projecting from the housing and guiding air, dirt and dust sucked into the housing via the suction port;
  an electric cleaner body connected to the bend of the suction device and generating a suction force by unit of an electric blower fan, and being capable of winding a sheet around the periphery of the rotary brush and performing the wipe-off cleaning of the surface to be cleaned by using the sheet; and
  a sheet-removal control unit which operates the motor to drive the rotary brush in repeated positive and reverse rotations in order to remove the sheet wound around the periphery of the rotary brush.

2. An electric vacuum cleaner according to claim 1, wherein the sheet-removal control unit increases the suction force of the electric blower fan to a high level.

3. An electric vacuum cleaner according to claim 1, wherein the sheet-removal control unit activates the rotary brush after the lapse of a predetermined length of time from a startup of the electric blower fan.

4. An electric vacuum cleaner according to claim 1, further comprising a sheet-winding control unit which operates the motor to rotate the rotary brush at a predetermined rotational speed and in a predetermined direction and controls the suction force of the electric blower fan to the lowest level.

5. An electric vacuum cleaner according to claim 1, wherein a wet sheet is used as the sheet.

6. An electric vacuum cleaner according to claim 4, wherein the housing has a blocking member provided therein for inhibiting the sheet from being wound around the periphery of the rotary brush when the rotary brush is rotated in a direction opposite to the predetermined direction.

7. An electric vacuum cleaner according to claim 4, further comprising:
  a dust-collector function detecting unit arranged to determine whether a dust collector function provided in the electric vacuum cleaner is a predetermined dust collector function or not; and
  an inhibiting unit which inhibits a control by the sheet-winding control unit in a case where the dust collector function detected by the dust-collector function detecting unit is the predetermined dust collector function.

8. An electric vacuum cleaner according to claim 4, wherein a wet sheet is used as the sheet, and the motor rotates the rotary brush at a low rotational speed during startup and the rotational speed of the rotary brush is increased with time.

9. An electric vacuum cleaner comprising:
  a suction device including a housing having a suction port opposed to a surface to be cleaned, a rotary brush disposed in the housing and having a periphery partially facing into the suction port, and a motor incorporated in the housing and driving the rotary brush into rotation;
  an invert control unit which supplies an inversion signal to the motor at a predetermined time, the inversion signal being supplied for a predetermined length of time to alternately switch a rotational direction of the rotary brush between a positive rotation and a reverse; and
  an electric blower fan for generating a suction force, the electric blower fan being driven into a preset high-power operation by the invert control unit.

10. An electric vacuum cleaner according to claim 9, wherein the predetermined time is at a start of the rotation of the rotary brush.

11. An electric vacuum cleaner according to claim 9, wherein the predetermined time is when a predetermined operation switch is operated.

* * * * *